United States Patent [19]

Sagesaka et al.

[11] Patent Number: 5,619,361
[45] Date of Patent: Apr. 8, 1997

[54] INFORMATION TRANSMITTING/PROCESSING SYSTEM

[75] Inventors: Yasuhiro Sagesaka, Kodaira; Yoshifumi Kawamura, Tokyo; Junichi Tatezaki, Kodaira; Hideo Wada, Kanoya; Isao Kodama, Akita; Atsushi Ogane, Chiba, all of Japan

[73] Assignee: Hitachi, Ltd., Tokyo, Japan

[21] Appl. No.: 182,657

[22] Filed: Jan. 18, 1994

[30] Foreign Application Priority Data

Feb. 3, 1993 [JP] Japan .................................. 5-016150
Nov. 29, 1993 [JP] Japan .................................. 5-325921

[51] Int. Cl.⁶ .............................. H04B 10/00; G05B 23/02
[52] U.S. Cl. ........................ 359/172; 359/145; 359/167; 370/346; 340/825.08; 455/54.1
[58] Field of Search ..................................... 359/145, 167, 359/172, 113, 152; 370/95.1, 95.2, 95.3, 85.8, 110.1; 455/54.1, 95; 340/825.69, 825.72, 825.08, 825.54, 825.44, 323 R; 379/58, 59, 61, 63

[56] References Cited

U.S. PATENT DOCUMENTS

| | | | |
|---|---|---|---|
| 4,399,563 | 8/1983 | Greenberg | 359/113 |
| 4,682,351 | 7/1987 | Makino | 379/61 |
| 4,924,417 | 5/1990 | Yuasa | 340/825.08 |
| 4,998,245 | 3/1991 | Tanaka et al. | 340/825.08 |
| 5,005,014 | 4/1991 | Jasinski | 340/825.44 |
| 5,043,976 | 8/1991 | Abiven et al. | 359/113 |
| 5,054,787 | 10/1991 | Richardson | 340/323 R |
| 5,061,922 | 10/1991 | Nishijima et al. | 340/825.08 |
| 5,329,575 | 7/1994 | Matsuda | 379/63 |
| 5,377,192 | 12/1994 | Goodings et al. | 370/110.1 |
| 5,404,572 | 4/1995 | Ishii | 359/145 |

FOREIGN PATENT DOCUMENTS

| | | | |
|---|---|---|---|
| 0338765 | 10/1989 | European Pat. Off. | 359/152 |
| 62-147846 | 7/1987 | Japan . | |
| 4-137836 | 5/1992 | Japan . | |

*Primary Examiner*—Leo Boudreau
*Assistant Examiner*—Bhavesh Mehta
*Attorney, Agent, or Firm*—Fay, Sharpe, Beall, Fagan, Minnich & McKee

[57] ABSTRACT

A base station (5) comprises a base transmitter (6) for transmitting information optically to a plurality of portable stations (1 to 4) at such a predetermined time interval as is designated by portable station designating information. Each of the portable stations (1 to 4) comprises a potable transmitter (7) for transmitting information optically to the base station (5) in response to the transmission, which is designated by the portable station designating information coming from said base station (5), and within the range of the aforementioned time interval immediately after said transmission. Transmissions (ACK1 to ACK4) from the mating portable stations to the base station are individually inserted between the interval periods of the transmissions (REQ1 to REQ4) from the base station (5) to the portable stations (1 to 4) so that the single base station performs optical communications with the plurality of portable stations in a half-duplex time sharing manner.

28 Claims, 19 Drawing Sheets

TRANSMISSION DATA FORMAT

NRZ CODE FORMAT

WIDTH OF 1 BIT : T(sec.)
TRANSMISSION RATE : P=1/T (bps)

CODE FORMAT WITH SUBCARRIER

LETTER t INDICATES THE PULSE WIDTH OF SUBCARRIER T > t.

INFORMATION TRANSMITTING/PROCESSING SYSTEM

BACKGROUND OF THE INVENTION

The present invention relates to a technology for transmitting/processing radio information between a control terminal of a game machine body or a personal computer and a single or a plurality of operation terminals of the game machine or a controlled terminal of a peripheral device or the like of a computer system and, more particularly, to a technology which is effective if applied for transmitting/ receiving data between the control terminal and the controlled terminal by optical communications.

Systems for the optical communications are well known in Japanese Patent Laid-Opens Nos. 147846/1987 and 137836/1992. In these Patent Laid-Opens, there are disclosed the optical communication systems, in which a plurality of portable stations individually transmit data to a base station at a predetermined time interval after the base station have transmitted data all at once to the portable stations.

On the other hand, the data transmissions between the body of a computer device such as a personal computer (PC) and a peripheral device connected for operations with the computer device body, such as a keyboard, a mouse, a digitizer, a printer, a scanner or an HDD are realized by cable wirings. Moreover, the data transmissions between a plurality of FA machines are realized by the cable wirings. Still moreover, the data transmissions between the body of an electric game machine and an operation terminal are realized by the cable wirings. The data are transmitted between those devices by one- or two-way communications.

SUMMARY OF THE INVENTION

In the optical communication, a large number of portable stations are difficult to control such that the data are sequentially transmitted from themselves to the base station. Thus, we have found that the data to be transmitted from the portable stations to the base station have have their reliabilities degraded. In short, an erroneous transmission may occur due to the optical interference. Also has been found is that even if the data are controlled to be transmitted from the plurality of portable stations to the base station, these owner and portable stations still have their responsiveness suppressed to low levels so as to retain the reliabilities. In other words, the individual portable stations sequentially respond after the base station has transmitted all the data at one time to the plurality of portable-stations, so that the information transmission is deficient in the real time properties and the responsiveness.

In case, moreover, the data communications between the computer device and the peripheral device, between the plurality of FA devices and between the electric game machine body and the operation terminal are to be accomplished by making use of the cable wirings, we have further found that the cable wirings in the entire system makes it difficult to connect the cables according to the additions, rearrangements and layout changes of the computer device and its peripheral device due to the presence of the cable wirings in the entire system. Especially in case the electric game machine body and the operation terminal are connected through the cable wirings, the operation terminal has its operation range restricted to deteriorate its treatment.

An object of the present invention is to provide an information transmitting/processing system which is enabled to realize high reliable information transmissions by preventing the radio interference in the information transmissions between one base station and a plurality of portable stations.

Another embodiment of the present invention is to provide an information transmitting/processing system capable of preventing an optical interference in the information transmissions by the optical communications between the base station and the plurality of portable stations.

Still another object of the present invention is to provide an information transmitting/processing system capable of improving the real time properties and the responsiveness in the information transmissions between the base station and the portable stations.

A further object of the present invention is to provide an information transmitting/processing system capable of ensuring flexibility in the establishment of the connections or links between the base station and the portable stations.

The aforementioned and other objects and novel features of the present invention will become apparent from the following description to be made with reference to the accompanying drawings.

The representatives of the invention to be disclosed herein will be briefly described in the following.

In the information transmitting/processing system of the present invention, one base station performs information radio transmissions in half-duplex communications in a time sharing manner with a plurality of portable stations. Noting the transmitter itself, as shown in FIG. 1, a base station 5 is equipped with an owner transmitter 6 and a base receiver 8 for radio-transmitting the information sequentially at a predetermined time interval to a plurality of portable stations 1 to 4 designated by the member machine designating information. The portable stations 1 to 4 are equipped with member transmitters for radio-transmitting the information to the base station 5 for the range of the aforementioned time interval immediately after the transmission of the base station 5 in response to the transmissions designated by the member machine designating information coming from the base station 5. Let it be assumed that the portable stations to be designated as the transmission objects by the base station 5 are the portable stations 1 to 4, for example. As shown in FIG. 1: the cycle capable of performing transmissions and receptions between the base station and the portable stations is designated at T2; a cycle T3 in the T2 cycle is a transmitting cycle of the base station; a cycle t3 is a transmitting cycle of the portable stations; a cycle t4 is an internal processing cycle of the base station for the transmissions of the same; and a cycle t2 is an internal processing cycle of the portable stations for transmissions of the same. Into time intervals REQ1 to REQ4 for the transmissions from the base station 5 to the individual portable stations, as is apparent from FIG. 1, there are inserted transmissions ACK1 to ACK4 from the mating portable stations to the base station. Thus, one base station performs radio transmissions of information in the half-duplex time sharing manner with the plurality of portable stations.

The information radio-transmitting mode may be the radio transmissions using radio frequencies. In order to reduce the influences of the noise which is caused by the circuit operations of the transmitter or the like, a modulation system such as the frequency diffusion modulation can be adopted although the circuit scale increases. As a countermeasure for inviting no increase in the circuit scale, the information transmitting mode can be the optical communications. Specifically, the transmitter includes a light emitting unit for outputting the information to be transmitted in the form of optical pulses, and the receiver includes a light receiving unit for receiving the optical pulses to output an electric signal.

Here is noted the transmission controller of the information transmission processing by the aforementioned time sharing half-duplex communications. At this time, the base station includes means for generating a base station transmission timing for enabling the information to be transmitted to a plurality of portable stations at a predetermined time interval between the individual portable stations. Data processing means receives the transmission timing for changing the information to discriminate a portable station object at each transmission timing received and for feeding the changed information to the base station transmission timing generating means. Likewise, each of the portable stations includes means for generating a portable station transmission timing for enabling the information to be transmitted in response to the transmission designated by the portable station designating information coming from the base station and within the aforementioned time interval immediately after the designated transmission. In response to this transmission enabling timing, the data processing means analyzes the portable station designating information received by the portable station receiving means. If the analysis reveals that the portable station designating information is one for designating itself, the data processing means feeds the information to be transmitted to the portable station transmission means, in synchronism with the transmission enabling timing generated by the aforementioned portable station transmission timing generating means.

As another means for improving the reliability of the information transmissions, there can be added to the aforementioned base station and portable station data processing means: a function to add error detecting/correcting codes to the information to be transmitted; and a function to detect and correct an error for the received information with reference to the error detecting/correcting codes contained.

When the control terminal is connected with the base station whereas the controlled terminal is connected with a portable station, a flexibility may be desired for establishing the connection or link between the base station and the portable station in dependence upon the functions or applications of the individual terminals. In order to cope with the desire, it is advisable to add a function to limit the range of assignable portable stations (as will be shortly referred to as the "paging function") to the timing for enabling the portable stations to be transmitted at a predetermined time interval. At a timing for enabling the individual portable stations to be transmitted at a predetermined time interval, moreover, a function to change the sequence of the assignable portable stations may be added to the base station data processing means.

In case the control terminal to be connected with the base station is exemplified by a data processing terminal such as a personal computer, the portable stations can be connected with the controlled terminal such as an input terminal, an auxiliary storage terminal or a printer terminal. In case, moreover, the control terminal to be connected with the base station is exemplified by the game machine body, the portable stations can be coupled to the operation terminals of the game machine. In order to improve the usability of the game machine operation terminal, the display control unit connected with the portable stations may be disposed at that game machine operation terminal.

In the invention of the mode, in which the aforementioned timing generating means and the aforementioned data processing means are more specific, the base station is equipped with a base station data processor which is coupled to the base station transmission means and the base station reception means. This base station data processor is constructed to include: timer means for generating a timing for enabling the information to be transmitted at a predetermined time interval for each of a plurality of portable stations; and a central processing unit for changing the discrimination information of a mating portable station at each transmission enabling timing generated by the timer means and for feeding the changed information to the base station transmission means.

The aforementioned portable station is equipped with a portable station data processor which is coupled to the portable station transmission means and the portable station reception means. This portable station data processor is constructed to include: timer means for generating a timing for enabling the information to be transmitted in response to the transmission designated by the portable station discrimination information coming from the base station and within the range of the aforementioned time interval immediately after the designated transmission; and a central processing unit for feeding the information to be transmitted to the portable station transmission means in synchronism with the transmission enabling timing generated by the timer means.

The operations of the base station data processor and the portable station data processor described above are determined by the operations programs to be executed by their central processing units. In case, therefore, the versatilities of the base station and the portable stations for the various control and controlled terminals, the data processors may be provided in advance with input/output circuits to be connected with the control and controlled terminals.

(1) According to the means described above, the portable station discriminating information is assigned to each portable station by the base station. This base station outputs the transmission signal containing the portable station discriminating information for discriminating the mate. The portable station recognizes whether or not it is the mate in accordance with the portable station discriminating information contained in its transmission signal. In response to this transmission signal, the portable station corresponding to its discrimination information analyzes the transmission signal and transmits a transmission signal as a response to the base station if any response should be made to the base station at the transmission source. In this way, the transmission from the base station and the responding transmission from the portable station are cyclically carried out with the portable station discriminating information being sequentially changed. Thus, the link between the base station and the portable stations is established in a time sharing manner by changing the portable stations sequentially, and the data communications between the base station and the portable station in the established link are carried out in a half-duplex manner.

These half-duplex data communications avoid not only the simultaneous transmissions from the base station to the portable stations and from the portable stations to the base station and accordingly the radio interference between one base station and a plurality of portable stations but also the optical interference in the optical communications.

Since the establishment of the aforementioned link between the base station and the portable stations is effected in the time sharing manner sequentially for the different portable stations, the response necessary for the transmission from the base station can be instantly effected to improve the real-time property and responsiveness in the information transmission.

As a result, the linear communications between either the existing cord-circuit system such as the personal computer and its peripheral unit or the game machine body and its operation terminal are realized highly reliably in a cordless manner.

The realization of these cordless linear communications corresponds to the private transmissions between a specific portable station and the base station.

(2) The use of the error detecting/correcting codes further improves the reliability of the cordless information transmissions.

(3) The support of the paging function by the base station gives a flexibility to the establishment of the connection or link between the base station and the portable stations. In case the base station is coupled to the game machine body whereas the portable stations are coupled to the game machine operation terminals, that paging function is applied to the setting of penalties for rejecting the operations from the game machine operation terminals for a predetermined time period as the game proceeds. On the other hand, the addition of the function to set the sequences of the assignable portable stations variably for the timing, at which the portable stations can be transmitted at a predetermined time interval, to the data processing means of the base station can also give the flexibility to the sequence in which the base station made an access to or a communication with the plurality of portable stations.

(4) The inclusion of the display control unit in the game machine operation terminals to be connected with the portable stations can easily correspond to the versatility of the game, that is, can display either such a content auxiliary in the game machine operation terminals as can not be displayed in the game machine body or the information which is to be privately transmitted for the remaining game machine operation terminals in view of the procedure of the game.

DESCRIPTION OF THE PREFERRED EMBODIMENTS

Figure 1:
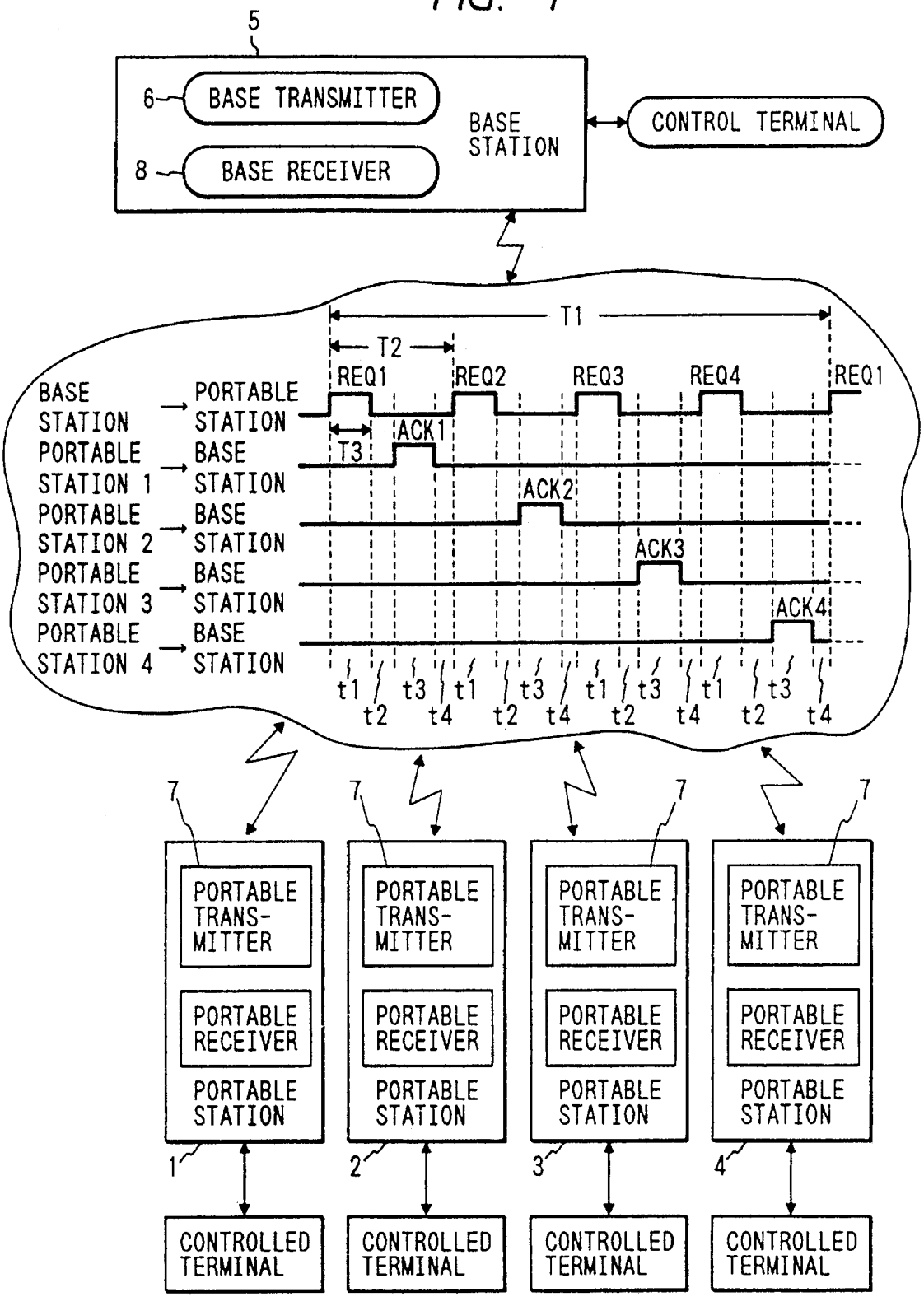
FIG. 1 is an explanatory diagram showing the overall transmission control procedure in an information transmitting/processing system according to the present invention.
Figure 2:
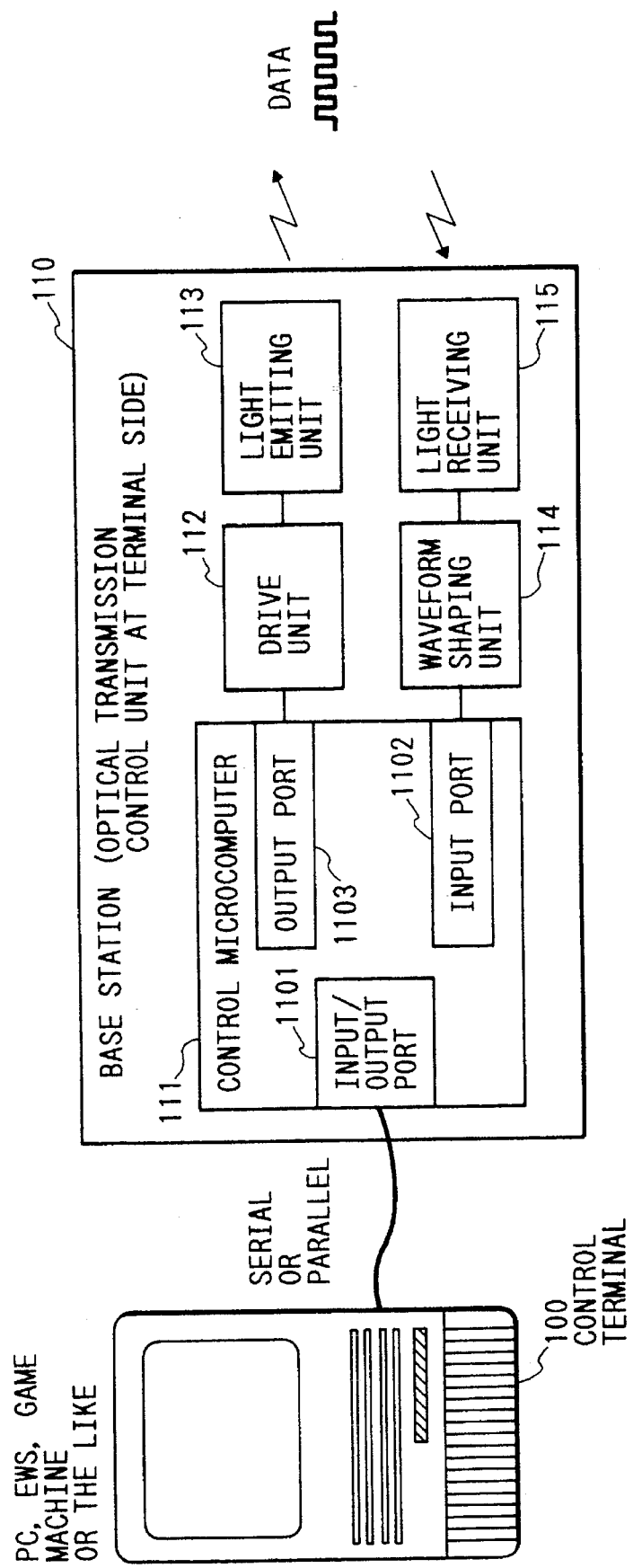
FIG. 2 is a block diagram showing the base station of the information transmitting/processing system according to one embodiment of the present invention.
Figure 3:
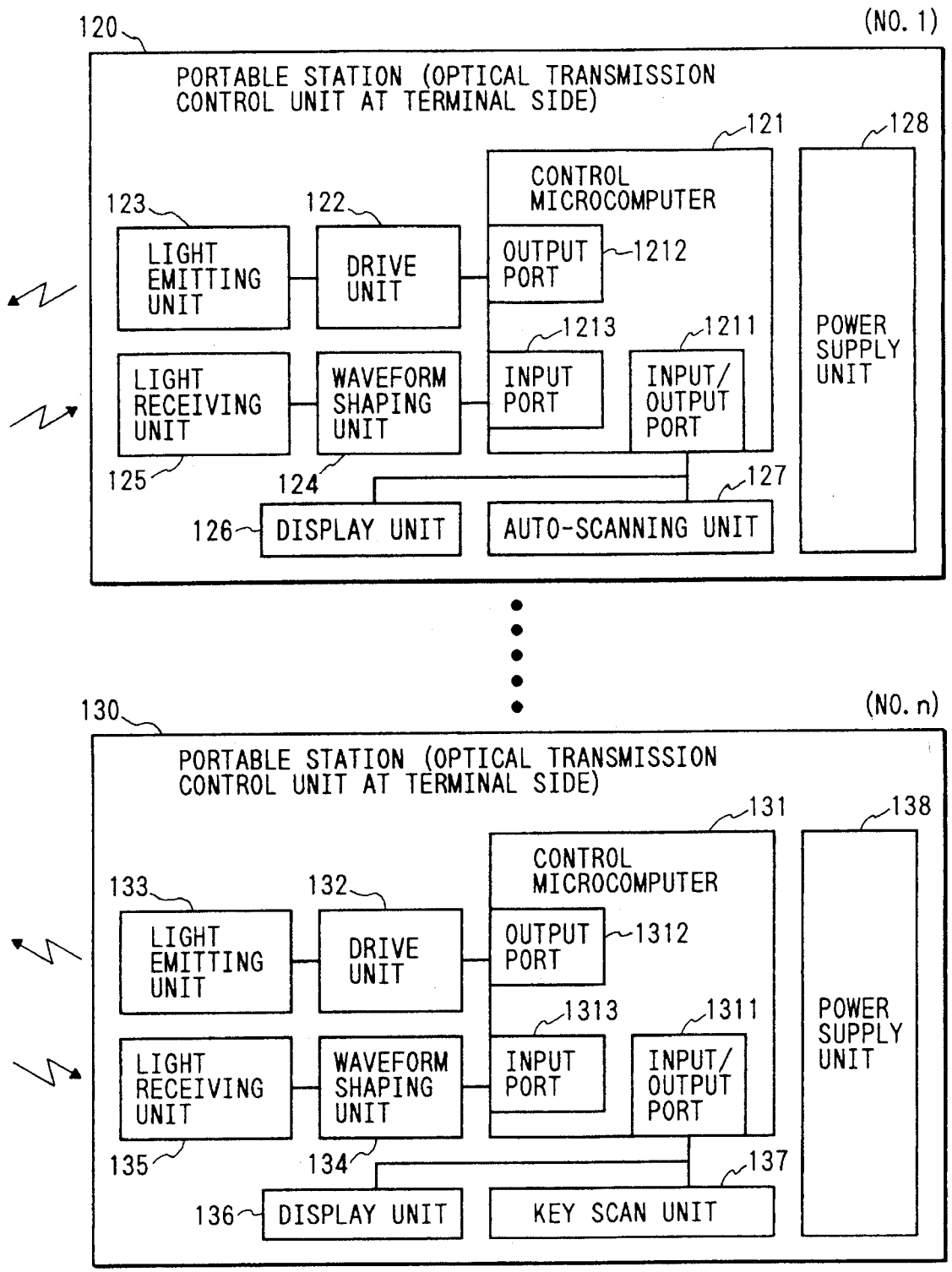
FIG. 3 is a block diagram showing the portable stations of the information transmitting/processing system according to one embodiment of the present invention.

FIG. 2 is a block diagram showing the base station of the information transmitting/processing system according to one embodiment of the present invention. FIG. 3 is a block diagram showing the portable stations of the aforementioned information transmitting/processing system.

The information transmitting/processing system, as shown in FIGS. 2 and 3, is one for realizing an optical communication system as an example of radio transmissions. The information transmitting/processing system is constructed to include: a control terminal 100; a base station 110 acting as an optical communication control unit at the control terminal side; and portable stations 120 and 130 acting as optical communication control units at the operation side or the controlled terminal side. The portable stations 120 and 130 are devices having a function, as one of the controlled terminal, to display the information of an optical signal received from the base station 110 in the screen, although not especially limited thereto. The control terminal 100 is exemplified by a personal computer (PC), an engineering work station (EWS) or a game machine body and is coupled to the base station 110 through a serial or parallel interface. The number of portable stations shown in FIG. 2 should not be limited to two.

The base station 110 is constructed to include: a microcomputer (as will be abbreviated to as "micom") 111 acting as a controlling data processor; a drive unit 112; a light emitting unit 118 coupled to the drive unit 112; a light receiving unit 115; and a waveform shaping unit 114 coupled to the light receiving unit 115. The drive unit 112 and the light emitting unit 118 constitute a base transmitter, whereas the light receiving unit 115 and the waveform shaping unit 114 constitute a base receiver. The control micom 110 is connected by a cable with the control terminal 100 through an input/output port 1101 packaged therein, to transmit data in a serial or parallel manner. Moreover, the control micom 110 is coupled to the output of the waveform shaping unit 114 through an input port 1102 packaged therein and to the input of the drive unit 112 through an output port 1108 packaged therein.

The aforementioned portable station 120 is constructed to include: a control micom 121; a drive unit 122 for driving a light emitting element; a light emitting unit 123 coupled to the drive unit 122; a light receiving unit 125; a waveform shaping unit 124 coupled to the light receiving unit 125; a display unit 125 and a key scan unit 127 connected with the input/output port 1211 of the control micom 121; and a power supply unit 128 for driving the system described above. The light emitting unit 123 and the drive unit 122 constitute a portable transmitter, whereas the light receiving unit 125 and the waveform shaping unit 124 constitute a portable receiver. The drive unit 122 has its input coupled to the output port 1212 of the control micom 121, whereas the waveform shaping unit 124 coupled to the input port 1213 of the control micom 121.

The aforementioned portable station 130 is constructed to include: a control micom 131; a drive unit 132 for driving a light emitting element; a light emitting unit 133 coupled to the drive unit 132; a light receiving unit 135; a waveform shaping unit 134 coupled to the light receiving unit 135; a display unit 136 and a key scan unit 137 connected with the input/output port 1311 of the control micom 131; and a power supply unit 138 for driving the system described above. The light emitting unit 133 and the drive unit 132 constitute a portable transmitter, whereas the light receiving unit 135 and the waveform shaping unit 134 constitute a portable receiver. The drive unit 132 has its input coupled to the output port 1312 of the control micom 131, whereas the waveform shaping unit 134 coupled to the input port 1313 of the control micom 131. The portable station of the present embodiment includes the display unit 136 and the key scan unit 137 as its controlled terminal, although not especially limited thereto.

The control micom 111 of the aforementioned base station 110 outputs a transmission voltage signal from its output port 1103 to the drive unit 112. This drive unit 112 outputs a transmission current signal to the light emitting unit 113. This light emitting unit 113 transmits an optical base station transmission signal to the plurality of portable stations 120 and 130. The light receiving unit 115 receives an optical portable station transmission signal transmitted from the portable station 120 or 130 and outputs a transmission current signal to the waveform shaping unit 114. This waveform shaping unit 114 outputs a transmission voltage signal to the input port 1102 of the control micom 111.

The portable stations 120 and 130 are similar in the transmitting/receiving operations of the optical signal. The key scan unit 127 of the portable station 120 is exemplified into an operation keyboard, which is operated to output the input data. This key scan unit 127 can be modified into a data input unit such as a keyboard, a mouse, a joy stick or a track ball, although not shown, for fetching the data. The data outputted from the key scan unit 127 are transmitted to and latched in the control micom 121 through the input/output port 1211 of the control micom 121.

The display unit 126 of the portable station 120 has a function to display the data (e.g., the date for displaying the time) received from the control micom 121.

The functions of the key scan unit 137 and the display unit 136 of the portable station 130 will not be described because they are identical to those of the key scan unit 127 and the display unit 126 of the portable station 120.

Figure 4:
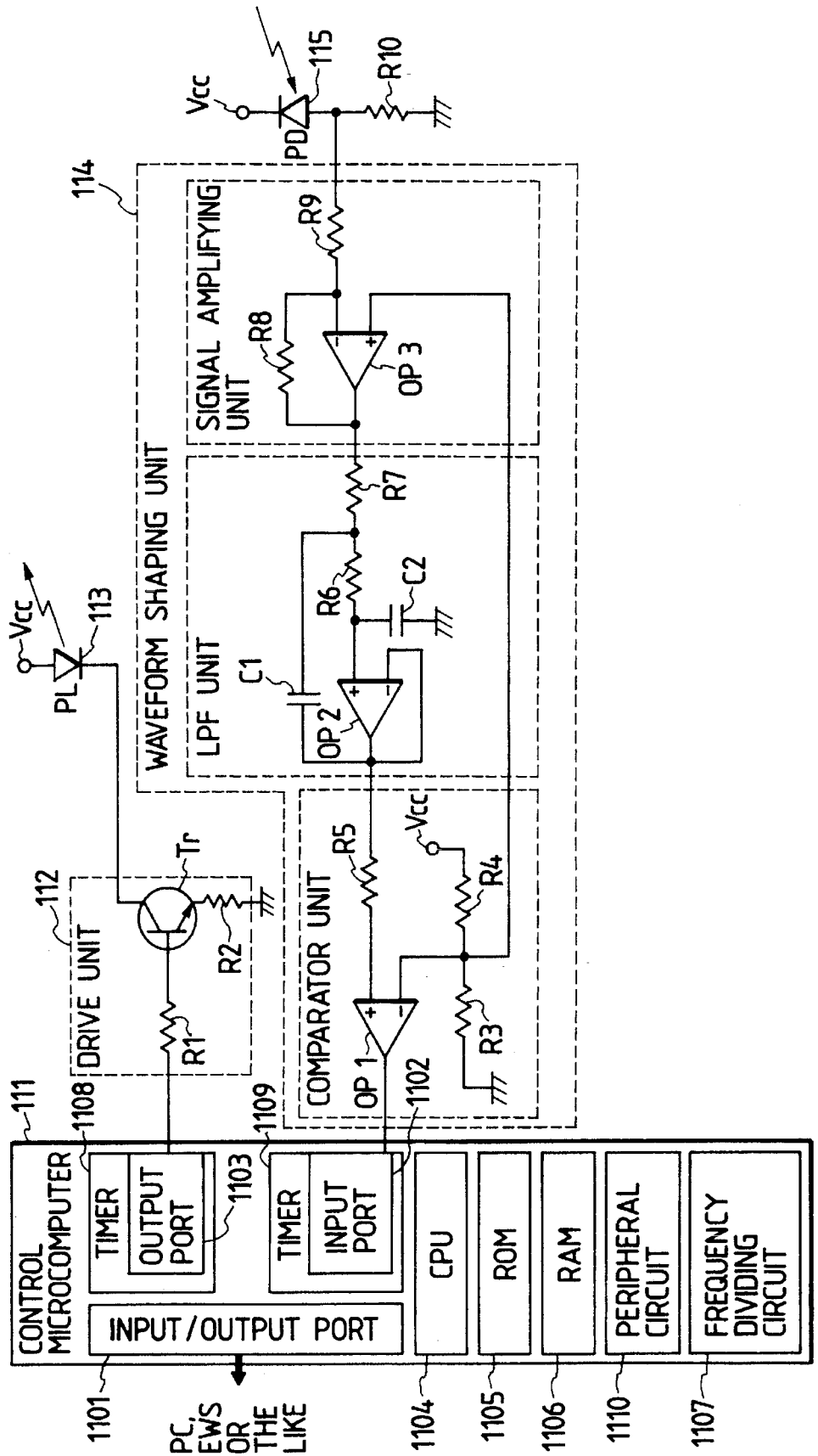
FIG. 4 is a detailed circuit diagram showing one example of the base station.

FIG. 4 is a detailed circuit diagram showing the base station 110. The light emitting unit 113 is composed of a light emitting element PL. This light emitting element PL has its one end supplied with a voltage at 5 V or the like. The drive unit 112 is constructed to include: a driving transistor Tr having a collector connected with the other end of the light emitting element PL, and an emitter and a base; a resistor R1 connected between the base of the driving transistor Tr and the output port 1103 of the control micom 110 so as to limit the base current of the driving transistor Tr; and a resistor R2 connected between the ground level and the emitter of the driving transistor Tr so as to determine a pulse current (i.e., the collector current of the driving transistor Tr). Here are made the following assumptions: the voltage fed from the output port 1103 of the control micom 110 is at 5 V; the resistor R1 is at 12 Kohms; the resistor R2 is at 5 ohms; and the collector amplification factor hfe of the transistor Tr is at 250. Then, the current to flow through the light emitting element PL is about 100 mA. Thus, if the voltage fed from the output port 1103 of the control micom 110 is at 5 V, the transmission signal is the data at "1", which is converted by the drive unit 112 into an optical current signal, which is further converted by the light emitting unit 113 into an optical pulse so that it is transmitted as an optical signal in the space. If the voltage fed from the output port 1103 of the control micom 110 is at 0 V, for example, the transmission signal is the data at "0" so that no substantial current flows through the light emitting element PL. As a result, no optical pulse is outputted.

The light receiving unit 115 is constructed to include a light receiving element PD for receiving an optical beam, and a loading resistor R10 connected between one end of the light emitting element PD and the ground level. The light emitting element PD has its other end fed with a voltage at 5 V or the like. The waveform shaping unit 114 is constructed to include: a signal amplifying portion 114 composed of resistors R8 and R9 and an operation amplifier OP3; a low-pass filter (LPF) portion composed of resistors R6 and R7, capacitors C1 and C2 and an operation amplifier OP2; and a waveform shaping comparator portion composed of resistors R3 to R5 and an operation amplifier OP1. The portable station transmission signal or the optical signal transmitted from the portable station 120 or 130 and received by the light emitting element PD establishes a minute electromotive force (at about several tens μ V to several mV) between the two ends of the loading resistor R10 of the light receiving element PD. This minute signal is amplified 500 to 1,000 times, although not especially limited thereto, by the subsequent signal amplifying portion and is inputted to the subsequent low-pass filter portion. The signal inputted to the low-pass filter portion is cleared, in the low-pass filter portion, of signal noise which is contained in the optical signal and which is caused by the disturbance noise due to a fluorescent lamp. This low-pass filter portion is easily realized by a secondary active filter which is composed of the resistors R6 and R7, the capacitors C1 and C2 and the operation amplifier OP2, although not especially limited thereto. The cutoff frequency for passing the transmission signal component is determined by the values of the resistors R6 and R7 and the capacitors C1 and C2. The transmission signal thus cleared of the noise is inputted to the subsequent waveform shaping Comparator portion. In the waveform shaping comparator portion, the transmission signal is shaped into a square wave by comparing the level of the transmission signal and a predetermined threshold voltage. As a result, the optical signal received by the light receiving unit 115 can be converted into the square wave and inputted to the input port 1102 of the control micom 110.

The control micom 111 is constructed to include: a central processing unit (as will also be abbreviated to "CPU") 1104 for controlling the entirety; a read only memory (as will also be abbreviated to "ROM") 1105 for storing the operation programs of the CPU 1104; a random access memory (as will also be abbreviated to "RAM") 1106 for providing the working area of the CPU 1104 or the temporary storage area of the data; a frequency dividing circuit 1107 for dividing either the clock signal fed from the outside or the oscillating output of an external oscillator to establish an internal operation reference clock signal; an output port 1103; a first timer 1108 to be used for the outputting operation of the output port 1103; an input port 1102; a second timer 1109 to be used for the inputting operation of the input port 1102; and another peripheral circuit 1110. These components are connected through internal buses including the not-shown data bus, address bus and control bus.

Figure 5:
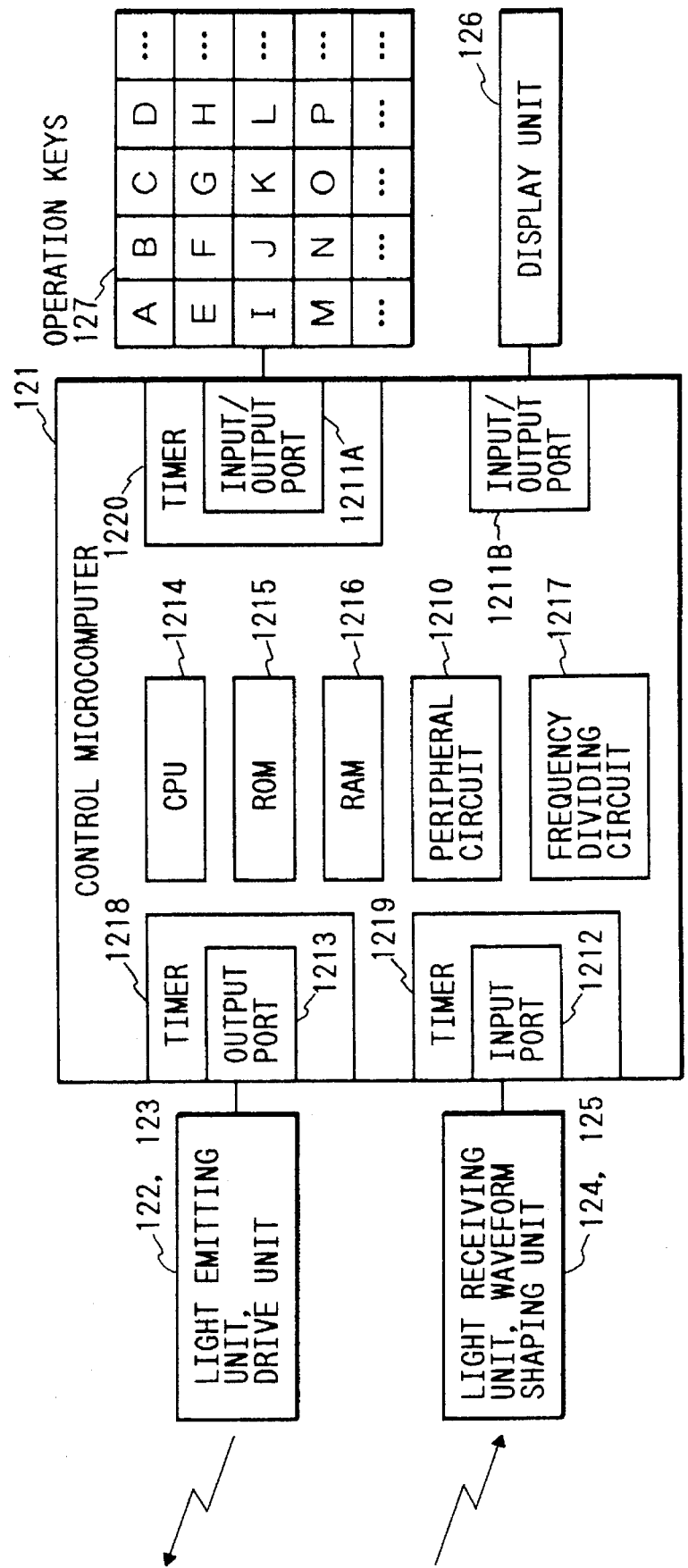
FIG. 5 is a detailed circuit diagram showing one example of the portable station.

FIG. 5 is a detailed circuit diagram showing one example of the portable station 120. The drive unit 122, the light emitting unit 123, the wave shaping unit 124 and the light receiving unit 125 of the portable station 120 are given circuit constructions similar to those of the drive unit 112, the light emitting unit 113, the wave shaping unit 114 and the light emitting unit 115 of the base station 110, as have been described with reference to FIG. 4. The control micom 121 is constructed to include: a central processing unit (as will also be abbreviated to "CPU") 1214 for controlling the entirety; a read only memory (as will also be abbreviated to "ROM") 1215 for storing the operation programs of the CPU 1214; a random access memory (as will also be abbreviated to "RAM") 1216 for providing the working area of the CPU 1214 or the temporary storage area of the data; a frequency dividing circuit 1217 for dividing either the clock signal fed from the outside or the oscillating output of an external oscillator to establish an internal operation reference clock signal; an output port 1213; a first timer 1218 to be used For the outputting operation of the output port 1213; an input port 1212; a second timer 1219 to be used for the inputting operation of the input port 1212; a first input/output port 1211A and a second input/output port 1211B included in the input/output port 1211; a third timer 1220 to be used for the input/output operations of the first input/output port 1211A; and another peripheral circuit 1210. These components are connected through internal buses including the not-shown data bus, address bus and control bus. In FIG. 5, the key scan unit 127 is shown as the operation key. The data inputted by the operation key 127 are temporarily latched in the RAM 1216 included in the control micom 121. Incidentally, the portable station 130 is given a construction similar to that of FIG. 5, although its detail is not shown.

Here will be described what specific products can construct the individual components by way of example. The product HD4074449 is used as the control microms 111 and 121; the product HE8813 is used as the light emitting element PL; the product HR8101 is used as the light receiving element PD; and the product HA17324 is used as the operation amplifier.

Figure 6:
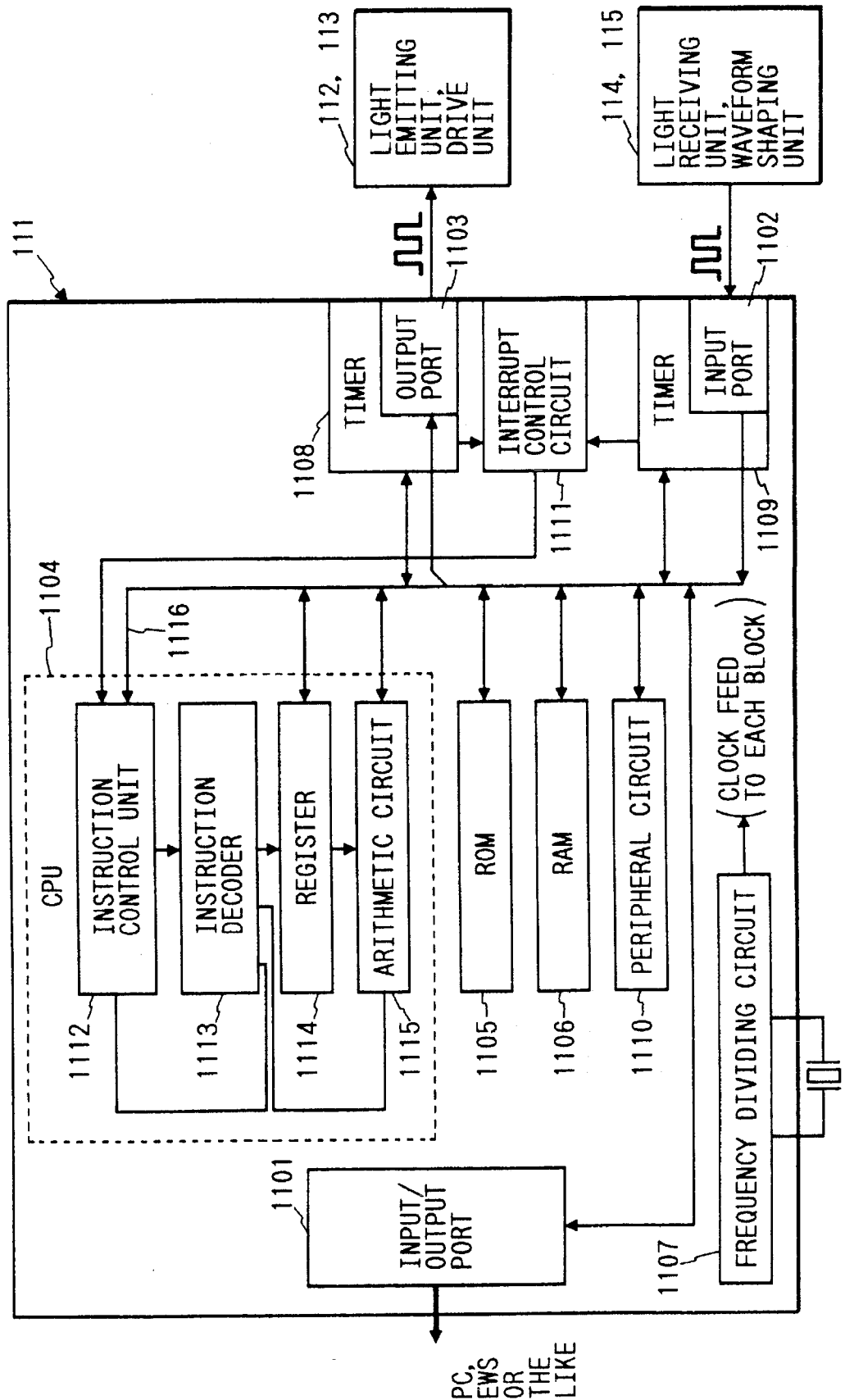
FIG. 6 is a detailed block diagram showing one example of a control microcomputer included in the base station.

FIG. 6 is a more detailed block diagram showing the aforementioned control micom 111. FIG. 6 shows the connection relations of the individual circuit blocks, as described with reference to FIG. 4, and one detailed example of the CPU 1104, but the description of the same circuit blocks as those of FIG. 4 will be omitted by designating them at the common reference numerals. The CPU 1104 is constructed to include an instruction control unit 1112, an instruction decoder 1113, a register 1114 and an arithmetic circuit 1115. The instruction control unit 1112 is composed of a program counter for holding an instruction address to be subsequently executed, an instruction address control circuit for controlling said instruction address to be subsequently executed, in response to an interruption or branching, and an instruction register for fetching the instruction to be executed from the ROM 1105. The instruction decoder 1113 decodes the instruction, which is fetched by the not-shown instruction register, to generate control signals to the individual units of the control micom. The register 1114 provides a temporary storage area for the data and addresses. The arithmetic circuit 1115 is equipped with an arithmetic logic operator for performing arithmetic operations according to the decoded results of the instruction. Incidentally, the various circuit blocks are coupled to an internal bus 1116 for exchanging the data, addresses and control signals.

Reference numeral 1111 appearing in FIG. 6 designates an interrupt control circuit. It should be understood that the interrupt control circuit 1111 be contained in the CPU 1104, as shown in FIG. 4. According to this example, the interrupt control circuit 1111 feeds a variety of pieces of interrupt information to the instruction control unit 1112 in response to a time-up (or time-out) signal or a count-up signal coming from the timers 1108 and 1109. In response to the interrupt information, the instruction control unit 1112 controls the transmissions to and the receptions from the portable stations. The contents of the controls will be described hereinafter.

Incidentally, the control micoms 121 and 131, although not shown, of the portable stations 120 and 130 are also given constructions similar to that of FIG. 6. It is, however, needless to say that the controls of the receptions from and the transmissions to the base station on the basis of the interrupt informations are made different.

Figure 7:
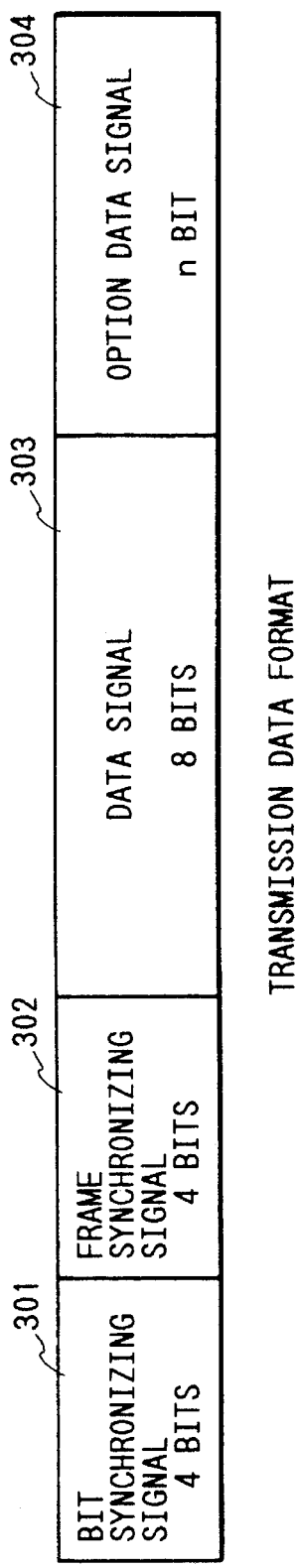
FIG. 7 is a format diagram showing one example of the transmission information which is transmitted between the base station and the portable stations.

FIG. 7 shows one example of the format of the transmission data to be transmitted between the base station and the portable stations. This transmission data format is constructed to include a bit synchronizing signal 301, a frame synchronizing signal 302, a data signal 303, and an option data signal 304, if necessary. This format is made common between the data transmissions from the base station to the portable stations and the data transmissions from the portable stations to the base station.

The bit synchronizing signal 301 has a pattern of 4 bits "1010", although not especially limited thereto, which is a bit string to be used for synchronizing the data when received. The frame synchronizing signal 302 has a pattern of 4 bits, which is composed of sixteen patterns of 0000 to 1111 and assigned as the channel data. These channel data are used as the information for discriminating the portable station which transmits the information with the base station. According to this example, specific portable station discriminating information (e.g., the portable station numbers) can be assigned to sixteen portable stations at the most. The portable station discriminating formation is one for designating the portable station which is the transmission mate of the base station and for clarifying the transmission source at the transmitting time from the portable station to the base station and is used for deciding the channels between the base stations or the portable stations.

The data signal 303 and the optical data signal 804 are the substantial data to be transmitted between the portable stations and the base station, and the option data signal 304 is used in case the data signal 303 is insufficient. According to the present embodiment, the data signal 303 is composed of 8 bits, although not especially limited thereto, and is used as a transmission allowing signal or a transmission allowing command (REQn) to the portable stations by the base station and for transmitting the data of the portable station itself such as the key data or the like from the operation key 127 of FIG. 5 by the portable station.

The option data signal 304 is used, in the case of the base station, as the display data or image data to be transmitted to the portable station. In the case of the portable station, the option data signal 304 is used if the data signal of 8 bits is insufficient other than the key data. In case, on the other hand, the portable stations are of 16 channels or more, the channel data are extended as far as the region of the data signal 303 so that the region of the option data signal 304 can be used as the key data or the transmission allowance signal.

In order to enhance the reliability of the data to be transmitted, the aforementioned option data signal 304 can be given an error correcting code (as will also be abbreviated to "CRC"). There can be enumerated the CCITT CRC-16 which is regulated at present according to the international standards of CCITT. A polynomial corresponding a bit string to be transmitted is divided by a generating polynomial, and the surplus polynomial is transformed into a bit string, which is added to the data before the data are transmitted. In case the generating polynomial has seventeen digits, for example, the surplus of the division has sixteen digits and is transmitted as a bit string of 16 bits. This operation is carried out by the CPU of the transmission side control microcomputer. At the reception side, the CRC computed at the transmission side is received after the data. At the reception side, the CRC is computed simultaneously with the data reception by using the generating polynomial used at the transmission side. If the computed value is equal to the received CRC, the procedure transfers to a subsequent operation while judging that the received data are correct. Otherwise, a re-send is demanded for the transmission side, or the data are corrected from the received data and the CRC value. This processing is carried out by the CPU included in the reception side control microcomputer.

Figure 8:
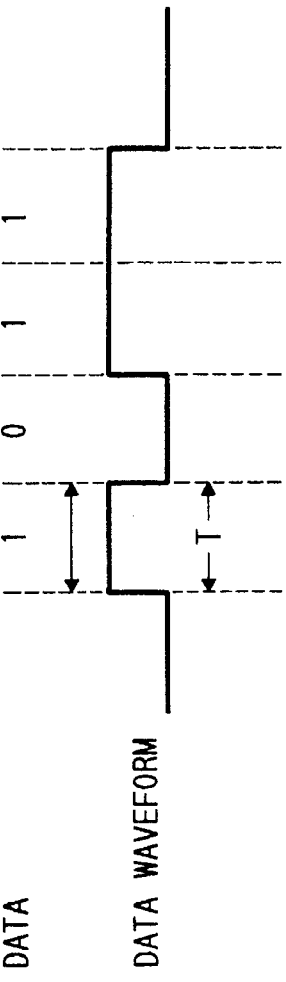
FIG. 8 is an explanatory diagram showing the level of a data signal in case the data to be optically transmitted are coded into an NRZ signal.

FIG. 8 shows an example of coding the data to be used for optical communications. In this example, there is shown the level of a data signal in case the data "1" and "0" are coded into the NRZ (i.e., Non Return to Zero) signal. This NRZ coding belongs to a data format, in which the "1" data are expressed by the "High" level whereas the "0" data are expressed by the "Low" level. Thus, the data of the aforementioned format can be transmitted and received.

Figure 9:
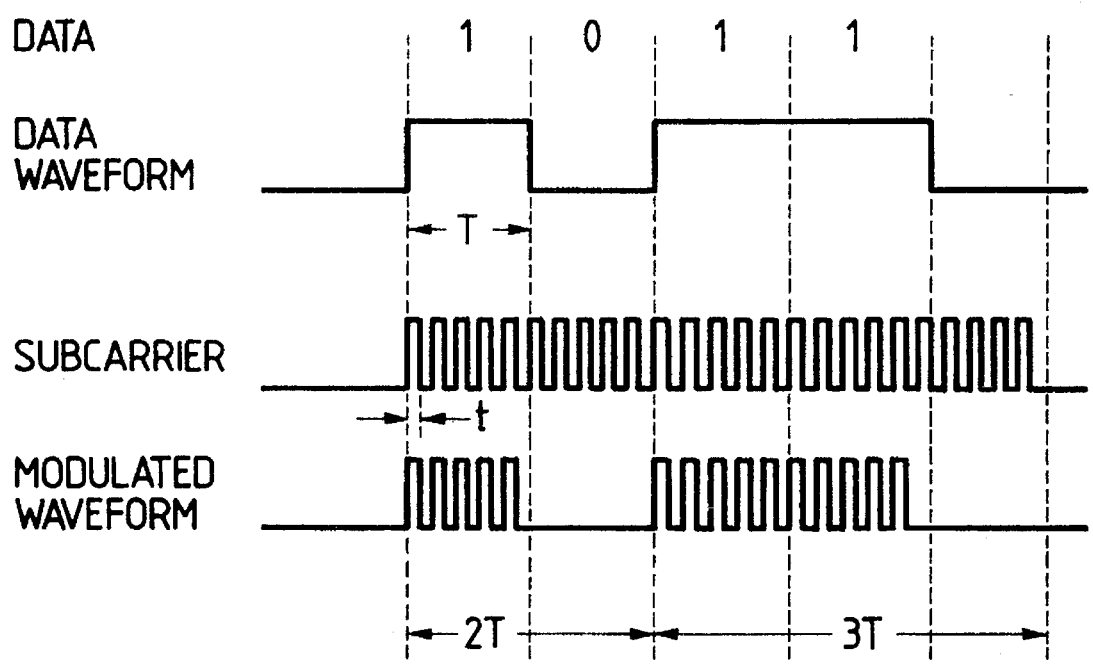
FIG. 9 is an explanatory diagram showing, as another data decoding example, the modulated waveform in which the data to be optically transmitted are decoded by adding a subcarrier to the NRZ decoded waveform.

FIG. 9 shows another data coding example. In this example, there is shown the modulated waveform which is modulated by adding a subcarrier (of a wave-form having a far higher frequency than that of the NRZ code) to the NRZ coded waveform. This modulation is adopted in the signal transmissions between a TV set and its remote control unit and has less influences from noises. In this system, the aforementioned drive unit 112 and waveform shaping unit 114 of FIG. 4 have their circuits partially modified. A modification is that the drive unit 112 has to be equipped with an AND gate for taking an AND between the transmission voltage signals outputted from a not-shown subcarrier waveform generator (using the timer output) and the output port of the control microcomputer 110. In the waveform shaping unit 114, on the other hand, a subcarrier suppressing integrating circuit (which can be constructed of an operation amplifier) is added after the low-pass filter LPF.

Figure 10:
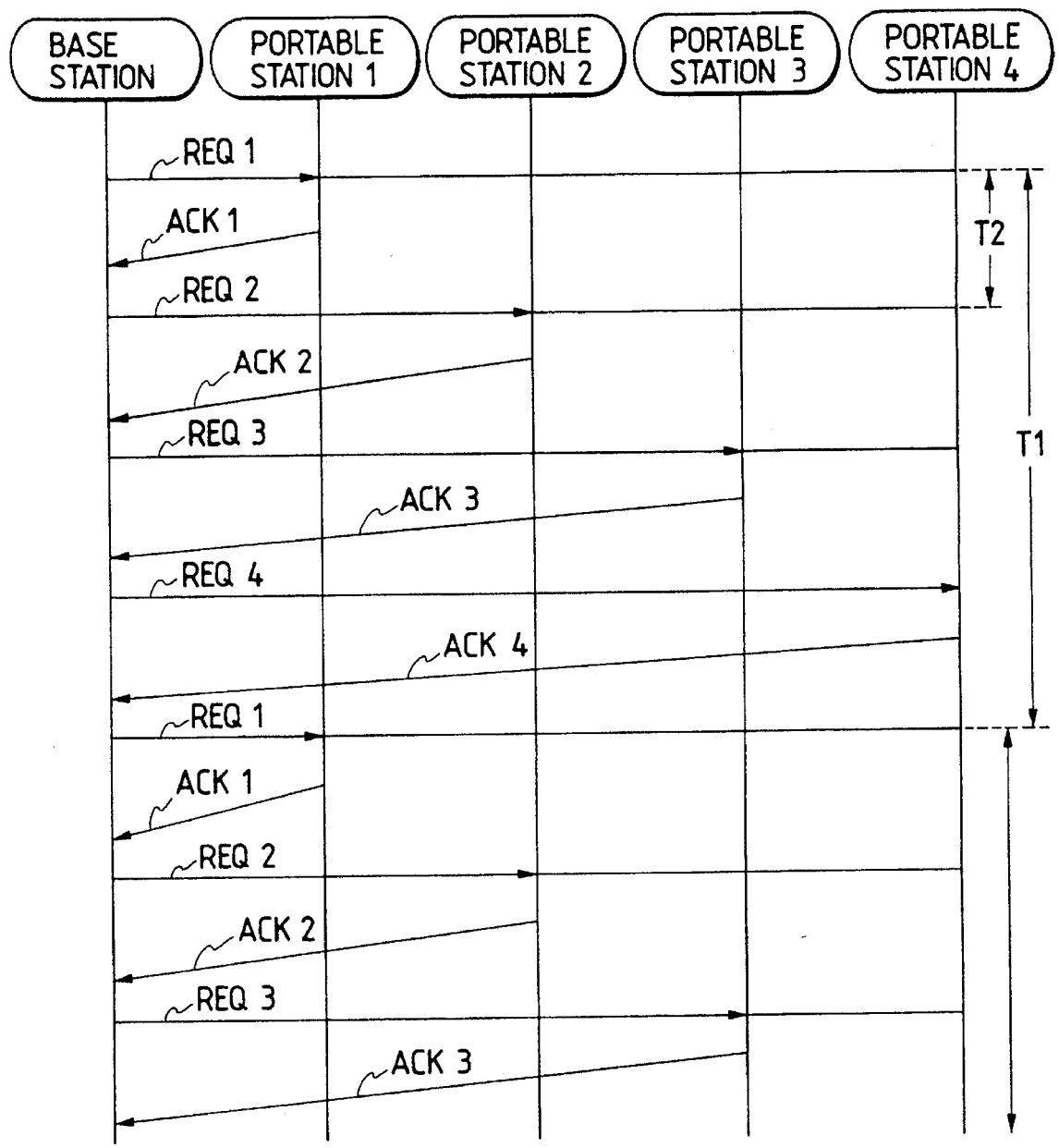
FIG. 10 is a timing chart showing the time sharing half-duplicate information transmissions between the base station and the portable stations by noting the formation of a communication link.
Figure 11:
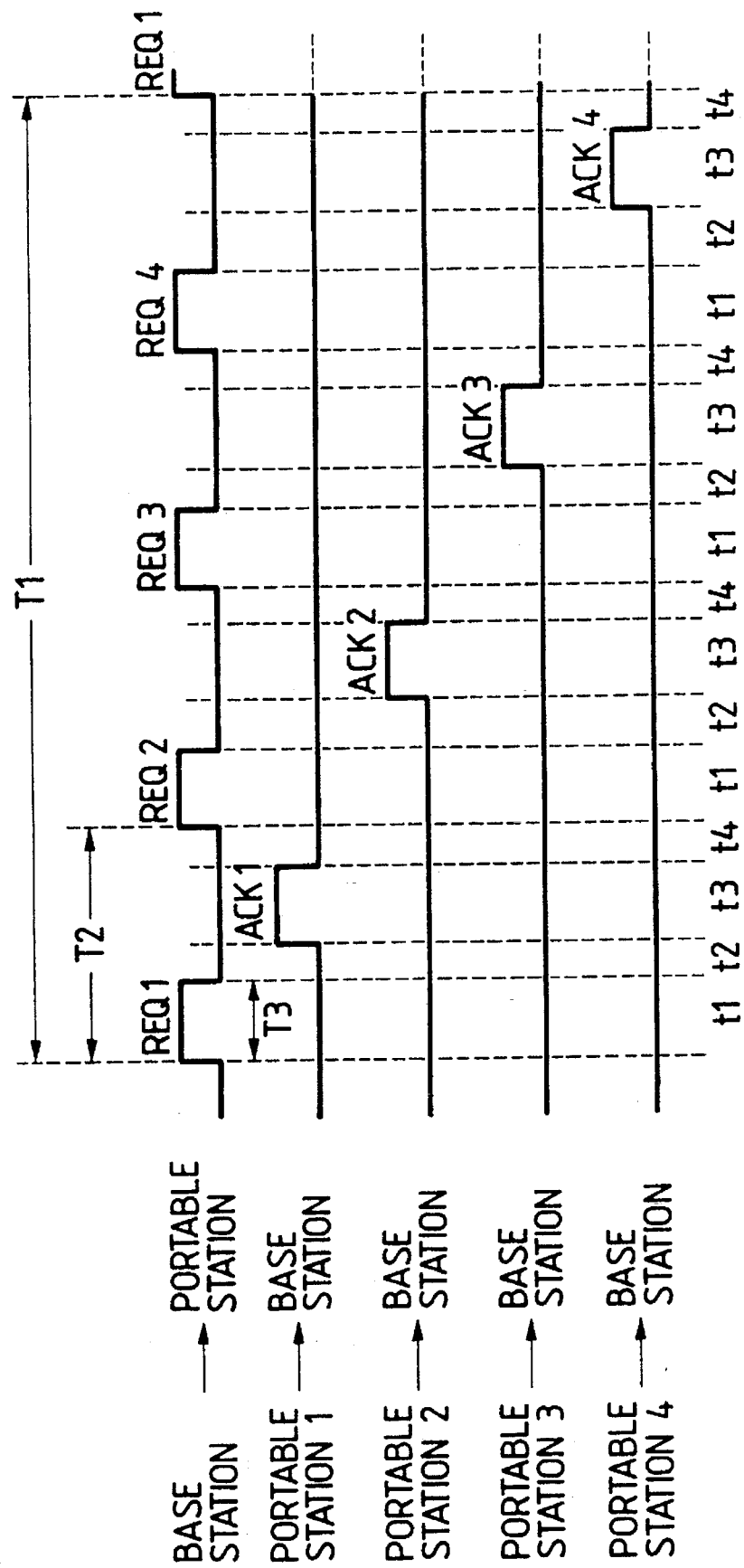
FIG. 11 is a timing chart showing the time sharing half-duplicate information transmissions between the base station and the portable stations by noting the transmitting/receiving timing.

FIG. 10 shows the information transmissions in a half-duplex time sharing manner between the base station and the portable stations while noting the generation of communication links, and FIG. 11 shows the same while noting the transmission/reception timings.

Here will be schematically described at first the information transmitting protocol in the information transmitting/processing system of the present embodiment. In the information transmitting/processing system of the present embodiment, one base station 110 performs information transmissions through optical communications in a half-duplex time sharing manner with a plurality of portable stations 120 to 130 such as four portable stations {as will be conveniently represented by portable stations 1, 2, 3 and 4}. Specifically, the base station 110 designates the portable stations 1 to 4 periodically in a predetermined sequence by the frame synchronizing signal 302 to transmit the information through the optical communications at a predetermined time interval. When designated by the frame synchronizing signal 302 coming from the base station 110, the portable stations to 4 respond to the transmission to transmit the information to the base station 110 through the optical communications within the range of the aforementioned time interval immediately after the transmission from said base station. Reference letters REQ1 to REQ4 designate the transmissions from the base station to the portable stations, and letters ACK1 to ACK4 designate the responding transmissions from the portable stations to the base station.

According to FIGS. 10 and 11, the transmission/reception enabling cycle between the base station and one portable station is designated at T2. In FIG. 11, letter T3 in the T2 cycle designate the transmission cycle of the base station, and letter t3 designate the transmission cycle of the portable station. Letter t4 designate an internal processing cycle of the base station for the transmission by the base station, and letter t2 designate an internal processing cycle of the portable station for the transmission by the portable station. As is apparent from the same Figures, the transmissions ACK1 to ACK4 from the mating portable stations 1 to 4 to the base station 110 are inserted between the interval periods of the transmissions REQ1 to REQ4 from the base station 110 to the individual portable stations, so that the single base station 110 performs the optical communications with the portable stations 1 to 4 in the half-duplex time sharing manner. As shown in FIG. 10, the cycle, in which the base station 110 performs one transmission to each of the four portable stations 1 to 4 so that the portable stations responsively perform the transmissions to the base station 110, is designated at T1. The cycle, in which the base station 110 performs one transmission to each of the portable stations so that the portable stations perform their individual transmissions to the base station, is designated at T2. The transmissions REQ1 to REQ4 from the base station 110 to the portable stations belong to the time period t1. The time period, for which the portable stations receive and analyze predetermined data from the base station 110 and transmit the analyzed data, is designated at t2. The time period, for which one portable station transmits predetermined data to the base station 110, is designated at t3. The time period, for which the portable stations transmit the data to the base station 110 so that the base station analyzes the data and transmits the subsequent data, is designated at t4.

Let the case be considered, in which a television monitor (as will also be abbreviated to "TV monitor") is connected as the control terminal 100 with the base station 110. The TV monitor has a screen of 1/30 frame so that a picture changes for every 1/30 seconds. Hence, let the case be considered, in which the data inputted on real time from the key scan unit to the TV monitor are transmitted to the base station 110 so that they are used as picture data of the TV monitor. The display time period of one frame of the TV monitor is 1/30 seconds=about 88.8 milliseconds=T1. In order that the base station 110 may perform a four-channel access, as shown in FIGS. 10 and 11, T2=T1/4=about 8.33 milliseconds. If the data transmission rate is 10 Kbps (i.e., bits per second) and if the bit number per data (i.e., the data of one frame) is 16 bits (in case there is no option data 304 of the data format shown in FIG. 7), the time period for transmitting one data is 1.6 milliseconds for both the base station and the portable stations. The time period required for the data processings at the portable stations and the base station is t2+t4=8.33−2×1.6 milliseconds=5.1 milliseconds. In case the operation data of the CPU in the control microcomputers 111 and 121 is about 1 microseconds per one instruction and in case the data processing can be realized by about 100 to 200 instructions (for about 0.2 to 0.4 milliseconds), the time period of 5.1 milliseconds to be used for the data processing is far longer than the time period of about 0.2 to 0.4 milliseconds necessary for the operation. As a result, the time sharing multiplex communications of four channels can be easily realized.

If the transmission rate and the bit number of data are fixed in the aforementioned values, the time sharing multiplex communications of as many as eight channels can be performed in this example. This is because the time period to be used for the data processing of the time sharing multiplex communications of eight channels is t2+t4=(T2=33.3 milliseconds/8)×4.17−2×1.6=about 1 millisecond, which is longer than the time period of 0.2 to 0.4 milliseconds necessary for the operation.

Figure 12:
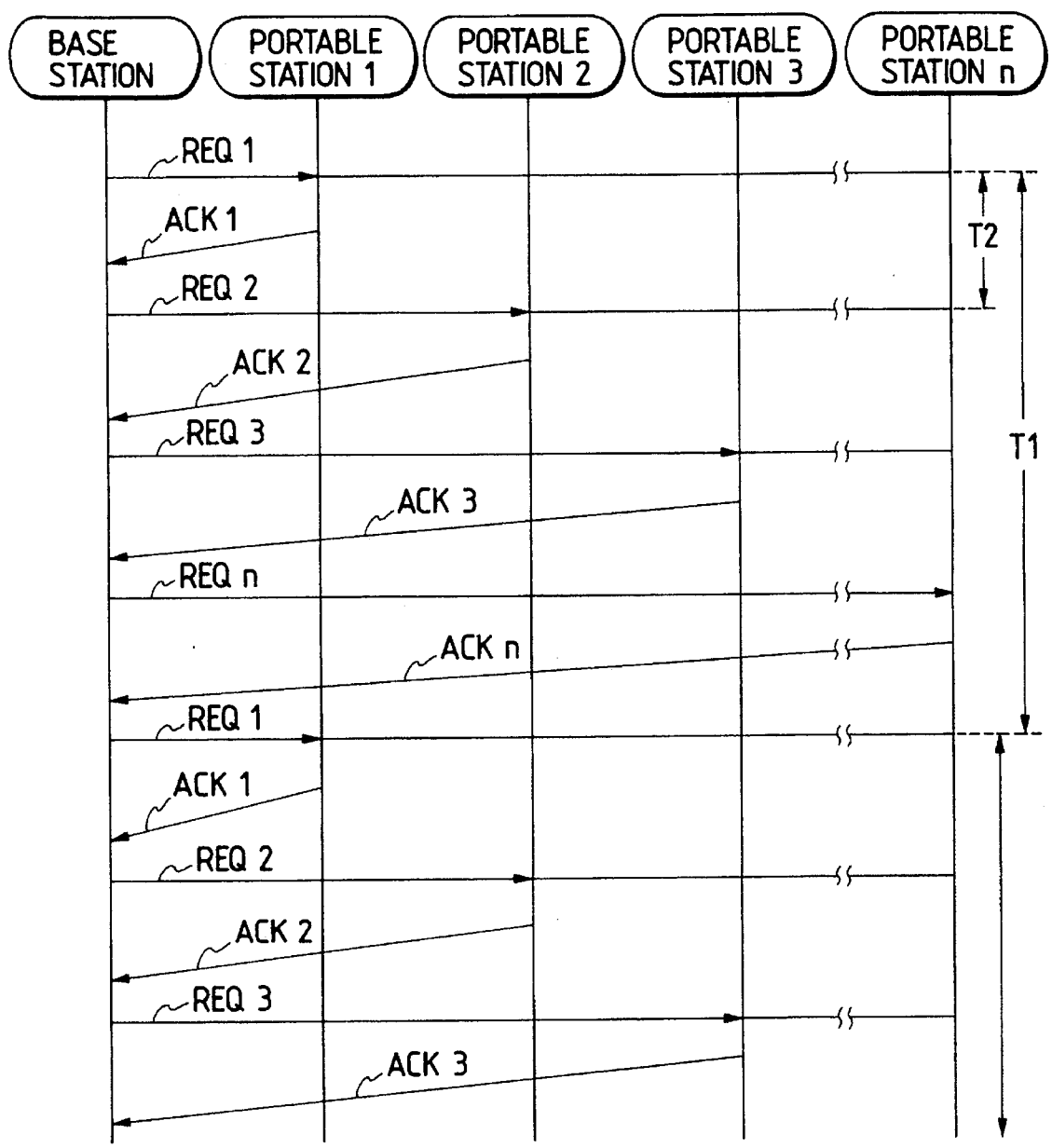
FIG. 12 is a timing chart similar to FIG. 10 but shows the case of an n-number of portable stations.
Figure 13:
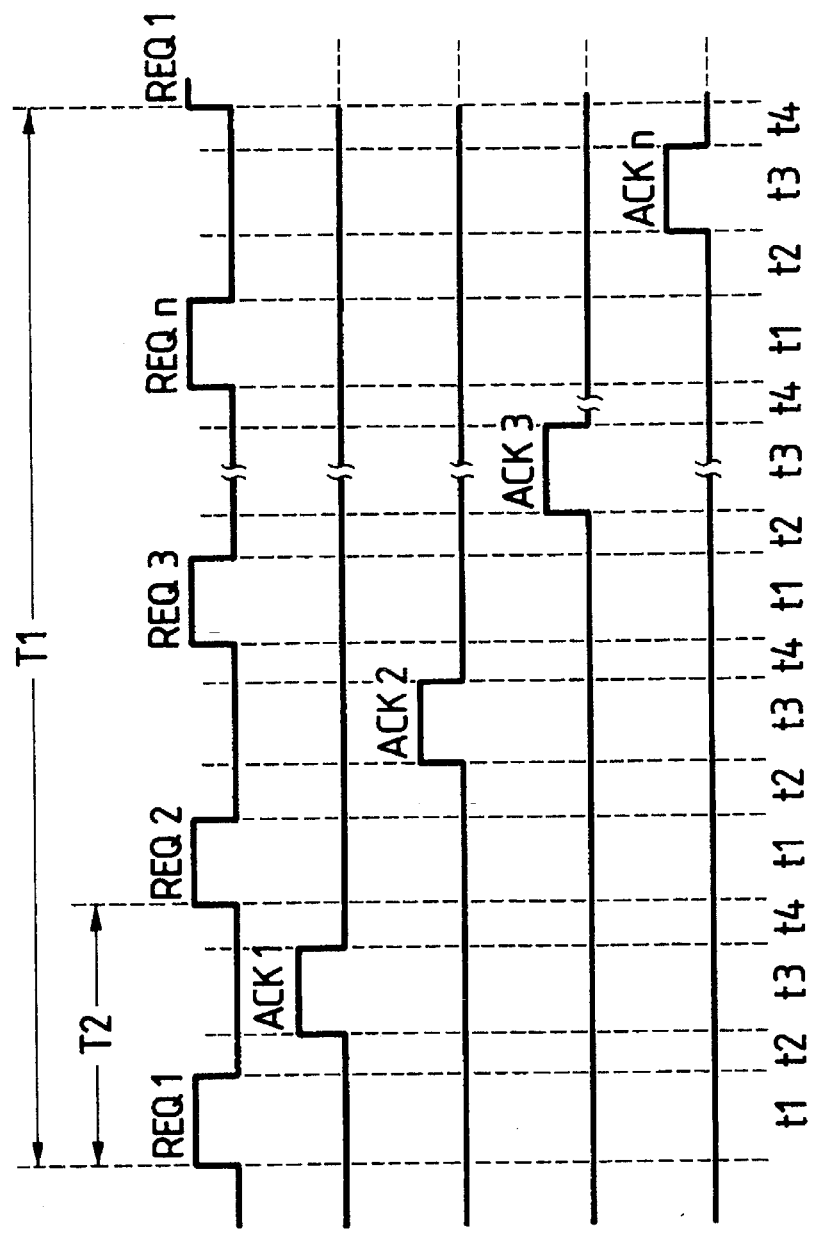
FIG. 13 is a timing chart similar to FIG. 11 but shows the case of an n-number of portable stations.

Of FIGS. 12 and 13 showing examples of the data transmission sequence of the n-channel multiplex communications in case an n-number of portable stations are used for the single base station 110, FIG. 12 notes the generation of the communication link, and FIG. 13 notes the transmitting/receiving timings. The periods T1 and T2 and the times t1, t2, t3 and t4 are defined like those of FIGS. 10 and 11. The data transmission rate is assumed to 10 Kbps in the description of FIGS. 10 and 11, but a transmission rate of the order of Mbps can be achieved in the case of the optical communications although it depends upon the optical elements.

If the data transmission rate is assumed to 1 Mbps while considering the data format shown in FIG. 7, the transmission time for one data is 16 microseconds. As a result, the transmission/reception time periods between the base station and the portable stations is t1+t3=2×16 microseconds=32 microseconds. If the data processing time off (t2+t4) is assumed to 0.4 milliseconds, T2=0.432 milliseconds. As a result, the maximum channel number in the period T1=33.3 milliseconds is 33.3/0.432=7 channels. Thus, it could be understood that the drastically multiple channels can be realized by increasing the data transmission rate.

Figure 14:
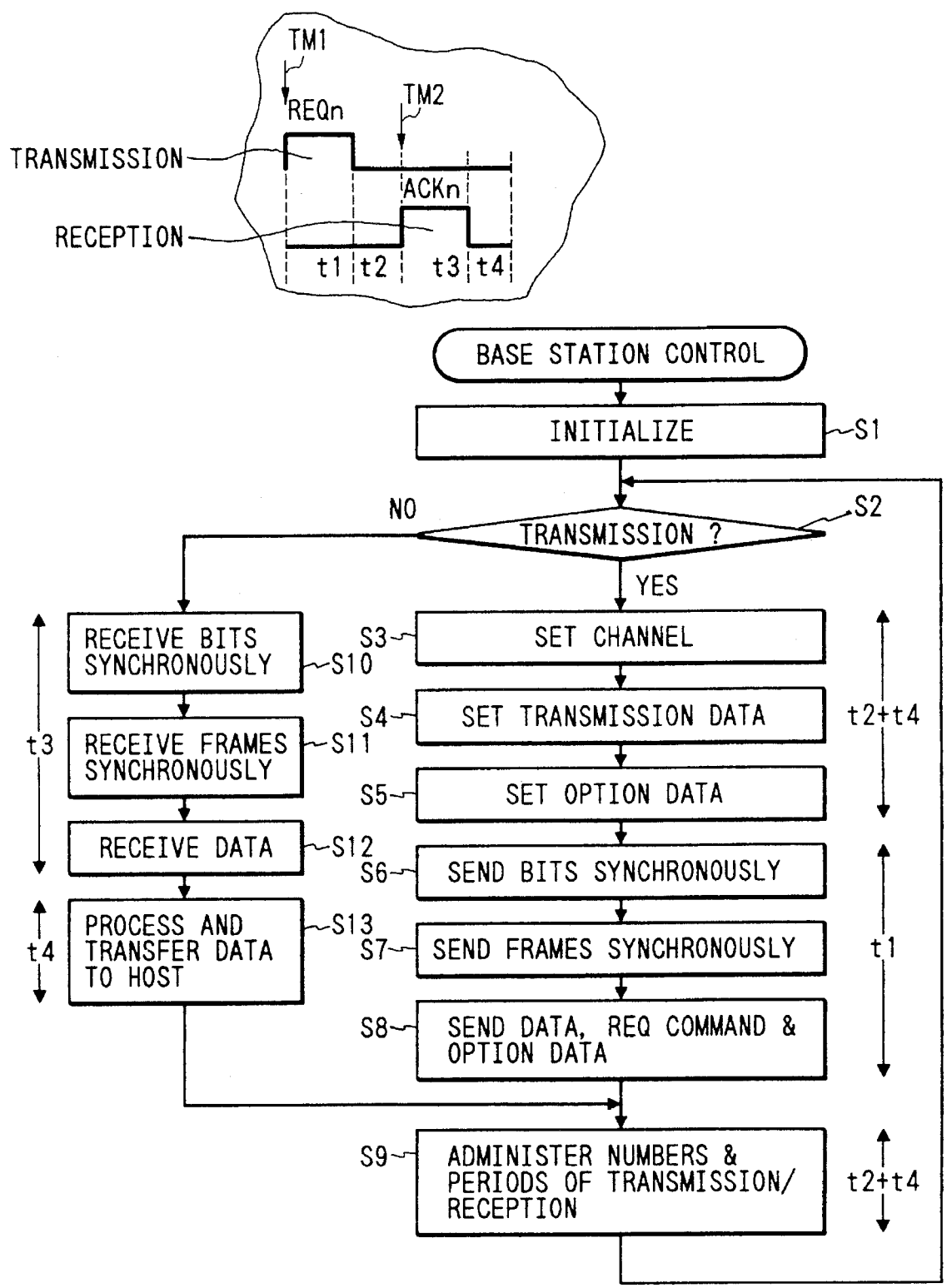
FIG. 14 is a flow chart showing one example of the data transmission control procedure of the base station.
Figure 15:
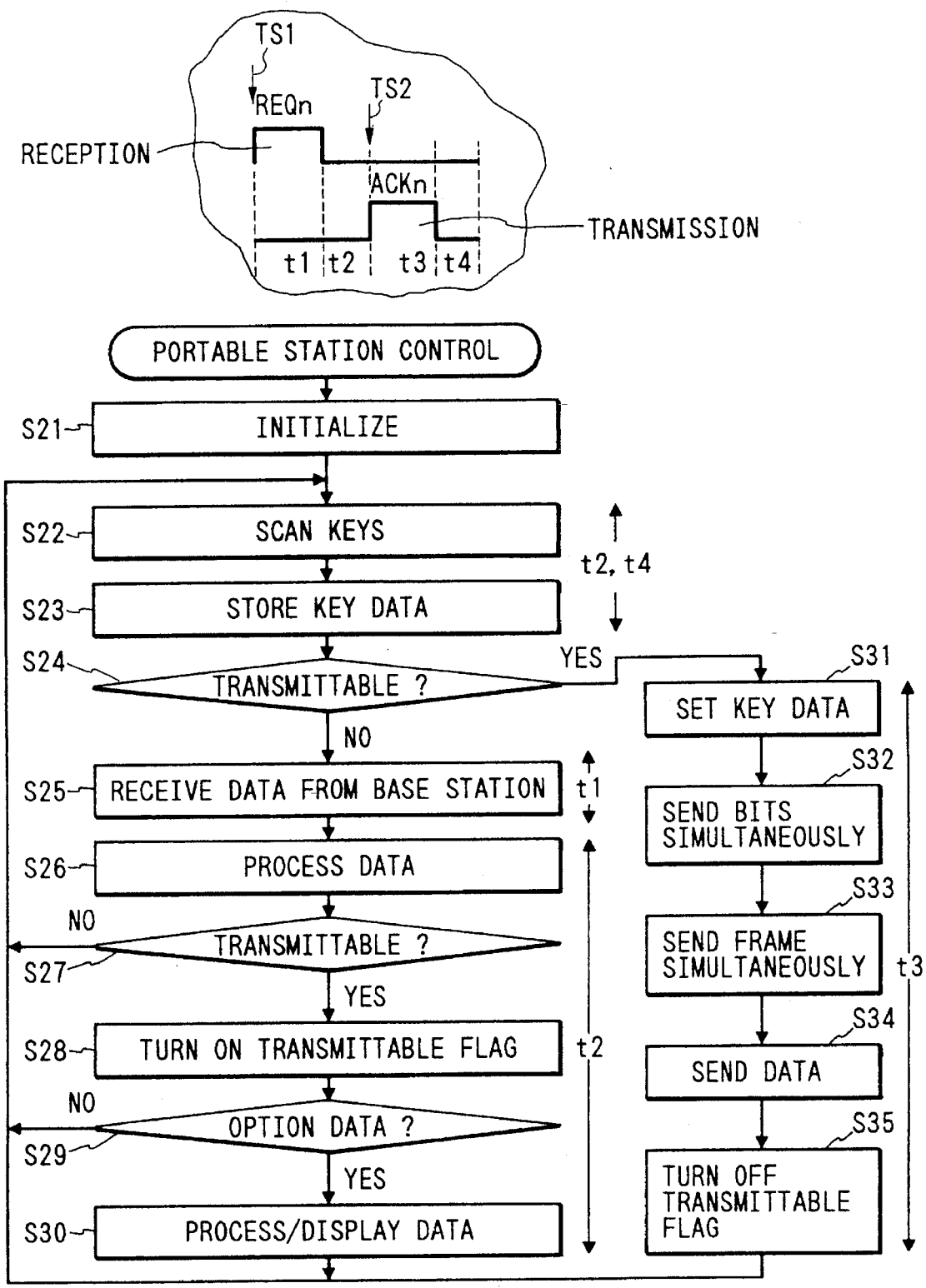
FIG. 15 is a flow chart showing one example of the data transmission control procedure of the portable stations.

FIG. 14 shows one example of the data transmission controlling procedure of the base station, and FIG. 15 shows one example of the data transmission processing procedure of the portable stations. With reference to these Figures and FIG. 6, here will be described in detail the control procedure of the data transmissions by the half-duplex time sharing communications.

The data transmission procedure of the base station will be described at first. The base station 110 is internally initialized by the power-on-reset (at Step S1). For example, the various times for the timers 1108 and 1109 of FIG. 6 are set, and the communication rate is set. In this initialization, the not-shown transmission enabling flag is initialized to the set status (indicating that the transmission can be effected). Moreover, the timing operation of a predetermined timer counter included in the timer 1108 is started. This period is set to the aforementioned value T2. The time-up, if any for every periods T2, is fed to the interrupt control circuit 1111 so that the transmission interruption is instructed to the CPU 1104. The time, at which the transmission is interrupted for the period T2, is conveniently designated at TM1. Moreover, the timer 1108 feeds the time-up signal to the interrupt control circuit 1111 for every times TM2 after lapse of (t1+t2) from the time TM1. Accordingly, the interrupt control circuit 1111 issues a reception interruption to the CPU 1104 at the time TM2.

Immediately after the initialization of the base station 110, the not-shown transmission enabling flag is in the set status. The control microcomputer 111 decides whether or not the transmission can be performed (at Step S2) by referring to the transmission enabling flag at every predetermined timings. At this deciding step, the internal processing of the transmission line or the reception line is selected.

If the transmission can be carried out, the CPU 1104 set the register 1114 with the frame synchronizing signal 302 for specifying the mating portable station (at Step S3). Next, the CPU 1104 sets the register 1114 with the information for the data signal 303 such as a transmission enabling command (at Step S4). Subsequently, the CPU 1104 sets the register 1114 with the option data signal 304, if necessary. The various pieces of information set in the register 1114 are either those stored in the RAM 1106 or those which are updated from the information stored in the RAM 1106. In either event, the data to be transmitted at a stage preceding the start of transmission are latched in the register 1114.

When the aforementioned transmission interruption is issued at the time TM1 to the CPU 1104, this CPU 1104 controls the transmission by feeding the output port 1103 with the information set in the aforementioned register 1114. Specifically, in response to the transmission interruption, the CPU 1104 sets such predetermined periodic data in the not-shown predetermined timer counter included in the timer 1108 as will be determined by the data transfer rate. In response to each transmission instructing interrupt information issued at each time-up from the interrupt control circuit 1111, the CPU 1104 controls the signal output through the output port 1103 to send the bit synchronizing signal 301 at the time TM2 (at Step S6). Subsequently, the frame synchronizing signal 302 in the register 1114 is sent out (at Step S7), and the data signal 303 and the option data signal 304 are sent out (at Step S8).

Here will be described in more detail the controls of the CPU 1104 to send out the aforementioned bit synchronizing signal and so on from the output port 1103. Specifically, the CPU 1104 decides sequentially from the leading bit whether the logical value of the data stored in the register 1114 is at "1" or "0". The width of the transmission signal is administered by the timer 1108. In case the result of decision of the predetermined bit by the CPU 1104 is at the logical value "1", the CPU 1104 continues feeding the signal of the high level to the output port 1103 for the time period specified by the interruption of the aforementioned transmission instruction. In the case of the logical value "0", the CPU 1104 continues outputting the signal of the low level to the output port 1103 for the time period specified by the interruption from the timer 1108. The CPU 1104 sends the data continuously to the portable stations by repeating those operations at every interruptions of the timer 1108.

After all the data have been sent out, the CPU 1104 confirms whether or not the number of transmissions is equal to the number of data latched in the register 1114, and decides the transmission period instructing information in the register 1114, e.g., whether or not the periods for the data to be transmitted to the portable stations have changed, while being prepared for the subsequent transmission. Then, the CPU 1104 returns the aforementioned not-shown transmission enabling flag to the reset status (at Step S9). This step of returning the transmission enabling flag to the reset status is carried out by issuing the reception interruption in synchronism with the aforementioned time TM2. In other words, the reception enabling timing is specified on and after the time TM2. By way of this, the control of the CPU 1104 is returned to the foregoing Step S2.

In the aforementioned reset status of the transmission flag, the CPU 1104 decides that the transmission is impossible at Step S2, and the routine is branched to the reception line. When an edge change is then inputted at first to the input port 1102, the reception starting interruption is fed to the CPU 1104 through the interrupt control circuit 1111. The CPU 1104 made receptive of that interruption is prepared to set a predetermined periodic data corresponding to the signal width of the predetermined reception data bit in the not-shown predetermined time counter included in the timer 1109. In response to each reception instructing interrupt information issued from the interrupt control circuit 1111 at each time-up according to the setting of the periodic data, the CPU 1104 transfers the information inputted with a predetermined signal width at the input port 1102 to the register 1114, and decides whether the received signal bit is at the logical value "1" or "0" from the data transferred to the register 1114. The result of this decision is stored in the RAM 1106. This processing is carried out for every signal width of the received signal. By these control operations, the bit synchronizing signal 301 is received (at Step S10); the frame synchronizing signal 302 is received (at Step S11); and the data signal 803 and the option data signal 304 are received (at Step S12). The end of the reception is based upon the administration of the reception time (i.e., the time from the first edge change) by the timer 1109, although not especially limited thereto. Specifically, the reception is ended by the CPU 1104 when the reception end is fed from the timer 1109 to the interrupt control circuit 1111. After the end of the reception, the CPU 1104 brings the transmission enabling flag into the set status and reads out the received data stored in the RAM 1106. These read data are transferred through the input/output port 1101 to the control terminal 100 such as the personal computer PC or the engineering work station EWS (at Step S18).

Incidentally, the settings of the channel, the transmission data and the option data and the data transfer to the data processing host are carried out for the period t4. The sending of the bit synchronizing signal and the frame synchronizing signal and the transmissions of the data and the option data is carried out for the period t1. The administrations of the numbers and periods of transmissions and receptions are carried out for the period t2. The receptions of the bit synchronizing signal, the frame synchronizing signal and the data signal are carried out for the period t3.

Next, the procedure of controlling the transmitting/receiving operations of the portable station 120 will be described as a representative. The portable station 120 is internally initialized by the power-on-reset (at Step S21). This initialization involves the various time settings of the timers 1218 and 1219 of FIG. 5 and the setting of the communication rate. In this initialization, the not-shown transmission enabling flag is reset to its OFF status indicating that the transmission is impossible.

The portable station 120 performs a key scanning (at Step S22) and a key data storing (at Step S28) for the period of neither transmission nor reception. The key scanning step is to fetch the information, which is outputted by the operation of the operation key 127 shown in FIG. 5, from the input/output port 1211A, and the key data storing step is to store the fetched information in the RAM 1216. And, the CPU 1214 of the control microcomputer 121 decides every predetermined periods whether or not the transmission is possible, with reference to the not-shown transmission enabling flag (at Step S24).

In case the transmission is impossible, the portable station 120 awaits the transmission from the base station 110. In this status, if the edge change is inputted at first to the input port 1212 of FIG. 5, that is, if the signal of the leading bit of the bit synchronizing signal is inputted, the reception interruption is given to the CPU 1214 through the not-shown control circuit of the control microcomputer 121 in synchronism with a time TS1 of FIG. 15. In response to the interruption, the CPU 1214 sets such predetermined periodic data in the not-shown predetermined timer counter contained in the timer 1219 as correspond to the signal width of the predetermined reception data bit. In response to each reception instructing interrupt information issued from the not-shown interrupt control circuit at each time-up according to the setting of the periodic data, the CPU 1214 transfers the information inputted with a predetermined signal width at the input port 1212 to the register, and decides whether the received signal bit is at the logical value "1" or "0" from the data transferred to the register. The result of this decision is stored in the RAM 1216. By these control operations, the bit synchronizing signal 301 is received; the frame synchronizing signal 302 is received; and the data signal 803 and the option data signal 804 are received (at Step S25). The end of the reception is based upon the administration of the reception time (i.e., the time from the first edge change) by the timer 1219, although not especially limited thereto. Specifically, the reception is ended by the CPU 1214 when the reception end is fed from the timer 1219 to the interrupt control circuit. After the end of the reception, the CPU 1214 processes the received data (at Step S26) and decides whether or not the transmission is possible (at Step S27). Specifically, if the portable station 120 is designated as a transmission mate by the frame synchronizing signal, it is decided whether or not the transmission enabling command is contained in the data signal. If these conditions are satisfied, the transmission enabling flag is turned ON (at Step S28). It is further decided (at Step S29) whether or not the received data contain the option data. If the answer is YES, the option data are subjected to the necessary processing and displayed in the display unit 126. After this, the routine is returned to Step S22, and it is decided (at Step S24) whether or not the transmission is possible. Since, however, the transmission enabling flag is ON after the data reception, the routine of the CPU 1214 is branched to the transmission processing side.

The first reception interruption synchronized with the aforementioned time TS1 is caused as a result that the signal of the leading bit of the bit synchronizing signal is inputted to the input port 1212 by the transmission from the base station 110 so that the edge change is detected at first. In synchronism with the reception interruption, the CPU 1214 starts the timing operation of the predetermined timer counter contained in the timer 1218 of FIG. 5. After lapse of the time of (t1+t2), the timer 1218 feeds the not-shown interrupt control circuit with the time-up signal so that the not-shown interrupt control signal feeds the CPU 1214 with the transmission interruption.

The CPU 1214 thus given the transmission interruption sets (at Step S31) the not-shown register of the CPU 1214 with the bit synchronizing signal, the frame synchronizing signal (302) assigned to the portable station 120 and the key data, which are already stored in the RAM 1216 at the foregoing Step S23, as the data signal 303. Subsequently, the CPU 1214 feeds the information set in the aforementioned register to the output port 1213 to control the transmitting operations. The timing for starting the transmission is sequentially carried under the control of the CPU 1214 such that the CPU 1214 receives the transmission instructing interrupt information generated by the interrupt control signal 1111 each time the not-shown timer counter contained in the timer 1218 is timed up for a predetermined period (as determined by the data transfer rate) in synchronism with the aforementioned transmission interruption, although not especially limited thereto. As a result: the bit synchronizing signal 301 is sent out (at Step S32); the frame synchronizing signal 302 is sent out (at Step S33); and the data signal 303 and the option data signal 304 are sent out (at Step S34).

The control for the CPU 1214 to send out the aforementioned bit synchronizing signal from the output port 1218 is similar to that of the base station. Specifically, the CPU 1214 decides sequentially from the leading bit whether the logical value of the data stored in the register is at "1" or "0". The width of the transmission signal is administered by the timer 1218. In case the decision result of the predetermined bit by the CPU 1214 is at the logical value "1", for example, the CPU 1214 continues supplying the signal of the high level to the output port 1218 for the time period which is regulated by the interruption of the aforementioned transmission instruction from the timer 1218. If the logical value is at "0", the CPU 1214 continues outputting the signal of the low level to the output port 1218 for the time period which is specified by the interruption from the timer 1218. The CPU 1214 transmits the data continuously to the base station by repeating those operations for every interruptions from the timer 1218. After all the data have been sent out, the CPU 1214 returns the aforementioned not-shown transmission enabling flag to the OFF status (at Step S35). As a result, the control of the CPU 1104 is returned to the aforementioned Step S22.

Incidentally, the data inputted from the outside of the portable station by the aforementioned key scanning (of Step S22) are stored in the register in the microprocessor during the transmission. Since, however, the capacity of said register is fixed, the value of the register can be sequentially updated to effect the transmission if the data more than the capacity of the register are to be transmitted.

Moreover, the aforementioned processing timings of the portable station 120 are summarized such that the aforementioned key scanning and key data storing operations are carried out by making use of the time slot, as indicated by the period t4, and such that the data reception from the base station is carried out by the time slot, as indicated by the period t1. The data processing, the decision of the transmission possibility, the ON/OFF operation of the transmission enabling flag, the decision of the presence of the option data, and the data processing/display are carried out by making use of the time slot, as indicated by the period t2. In this time slot indicated by the period t2, the key scanning and the key data storage can also be carried out. The setting of key data, the bit synchronized sending, the frame synchronized sending the transmission of data are carried out by making use of the time slot, as indicated at the period t3. The remaining transmission control of the portable stations is likewise carried out.

Figure 16:
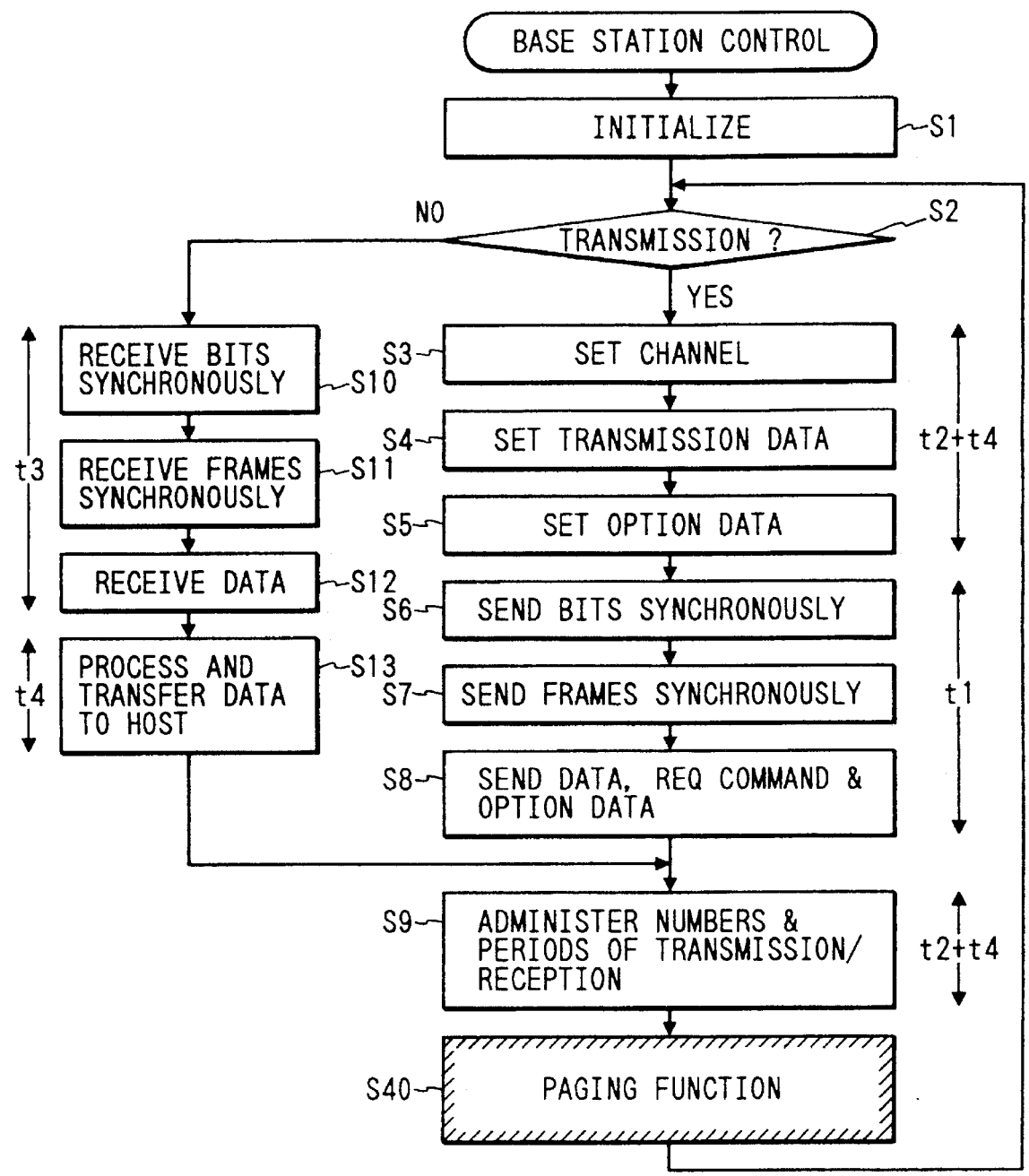
FIG. 16 is a flow chart showing one example of the data transmission control procedure of the base station in case the base station supports a paging function.
Figure 17:
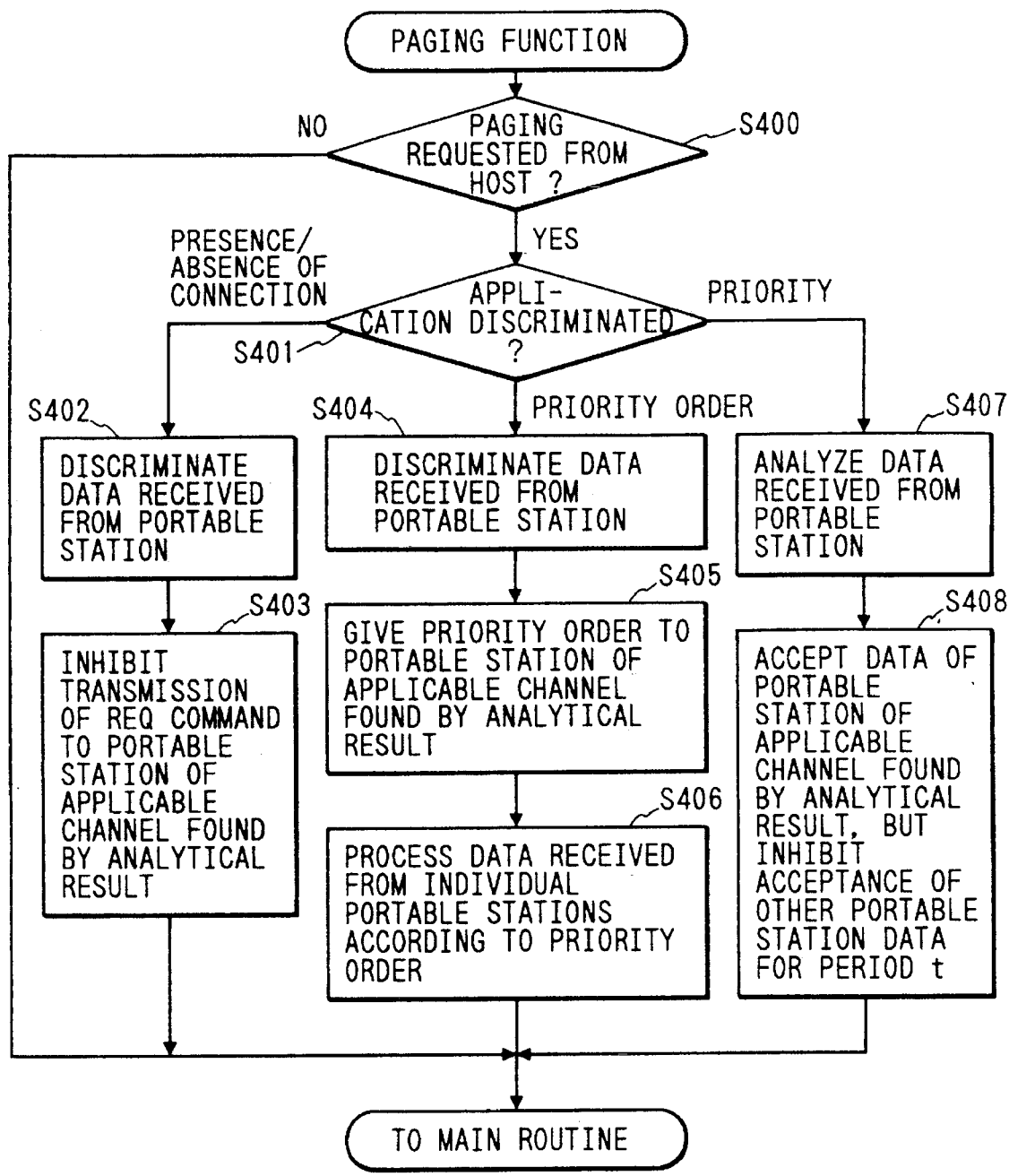
FIG. 17 is a flow chart showing one example of the detailed processing procedure of the paging function shown in FIG. 16.

FIGS. 16 and 17 show a data transmission control procedure of the base station in case the base station supports the paging function. Of these, FIG. 16 shows the basic data transmission processing procedure of the base station, and FIG. 17 shows the detailed processing procedure of the paging function.

In the present embodiment, the paging function is processed in the base station transmission control flow chart. The paging function is divided into one which is instructed by the control terminal 100 as to whether or not it is to be executed and the other which is executed by the base station itself. The former paging function can be roughly divided into three kinds having different control functions depending upon the paging function controlling applications (i.e., the paging function controlling programs).

1) First Processing Mode: In case the data received from the portable stations are discriminated at the 20 control terminal 100 to decide that the transmissions with some of the portable stations are to be temporarily stopped, the transmissions of the REQn signal (e.g., the transmission allowing command) to the corresponding portable stations are stopped, and the transmissions from the corresponding portable stations are also stopped.

2) Second Processing Mode: The sequence for the base station to access the portable stations is changed by discriminating the data received from the portable stations at the control terminal 100 to add the priority order of the corresponding portable stations.

3) Third Processing Mode: In case the data received from the portable station are discriminated at the control terminal 100 to decide that the transmissions with some of the portable stations are to be stopped, there is established a time period for which the reception of data from the corresponding portable stations are inhibited.

These functions can be used as penalty functions for giving such penalties to the portable stations as will leave some portable stations unaccessed for a predetermined period by the base station in accordance with the data from the portable station operation side in case the system is used as the game machine, for example. The latter (to be executed by the base station itself) is to change the number of channels (e.g., the assignment of the application channels) to be given to the portable stations and to change the priority of transmissions (e.g., the order for the base station to access the portable stations) to be given to the portable stations. As a result, the base station can arbitrarily set the number and statuses of peripheral circuits to be connected at the initial stage of communications. In case the system is used as the game machine, for example, the base station can set the number of game players arbitrarily at the start of the game.

Here will be described the flow chart of the paging function. In FIG. 16, the step of the paging function (at Step S40) is added after the aforementioned Step S9. The processings of the same step numbers as those of FIG. 14 are designated at the same numbers in FIG. 16, and their detailed description will be omitted.

When the paging function is entered at Step S40, as shown FIG. 17 at the CPU 1104 decides whether or not the paging is demanded (for executing the paging function) from the host, i.e., the control terminal 100 (at Step S400). If the answer is YES, the operation mode of the paging function designated by the demand is selected (at Step S401). The demand for the paging function includes the conditions at the portable stations when a specific portable station is excluded from the communication link or when the priority of communications is changed (as will be shortly referred to as the "changing conditions"). The operation mode to be selected at Step S401 is any of the aforementioned three kinds, although not especially limited thereto. In case the first processing mode is selected, it is analyzed whether or not the data received from the portable stations satisfy the changing conditions (at Step S402). According to the analytical result, the control information for inhibiting the transmission allowing command from being transmitted as the data signal for a predetermined period to the portable station having the corresponding channel is set in the not-shown control register (at Step 403), for example. In case the second processing mode is selected, the data received from the portable stations are analyzed (at Step S404). According to this analytical result, the priority of the portable stations of the corresponding channels is determined (at Step S405). The aforementioned not-shown control register is set with predetermined information so that the data received from the portable stations may be processed according to the priority (at Step S406). In case the third processing mode is selected, the data received from the portable stations are analyzed (at Step S407). According to this analytical result, the aforementioned not-shown control register is set with predetermined information so that the data from the predetermined ones of portable stations may not be received for a predetermined time. If no paging demand is made in the decision of Step S400, the control of the CPU 1104 is returned to the processing of Step S2, as shown in FIG. 16, when the processing of Step S403, S406 or S408 is ended.

At this time, the channel setting process (of Step S3) considers the priority of the portable station to be transmitted with reference to the aforementioned not-shown control register. In the processing of setting the transmission data (of Step S4), moreover, the transmission allowing command is not used for the portable stations inhibited from the transmission, but the undefined or transmission-inhibited command is set in the transmission data.

Figure 18:
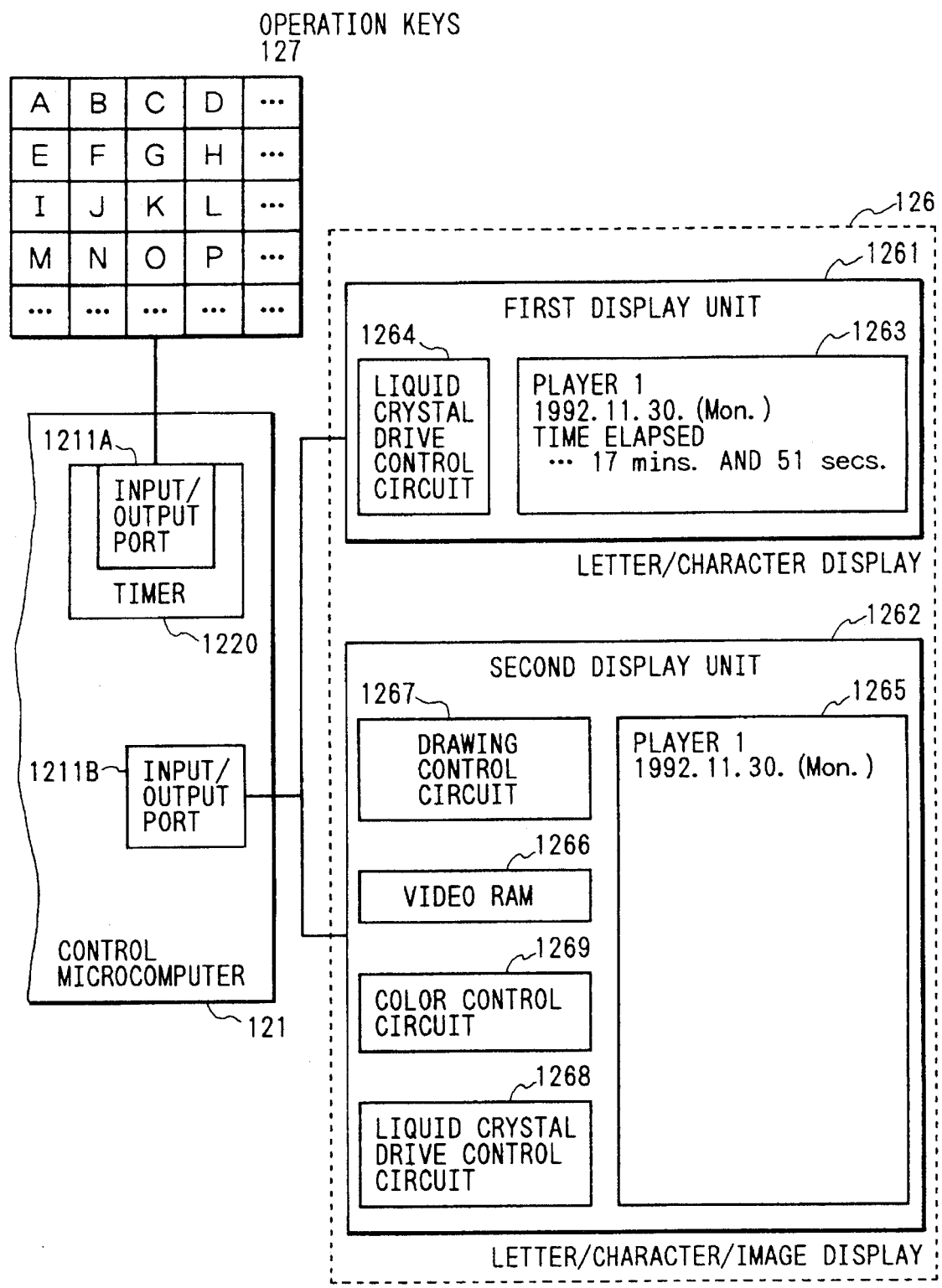
FIG. 18 is a block diagram showing one example of a display unit owned by a portable station.

FIG. 18 shows a detailed example of the display unit 126 of the portable station. The display unit 126, as shown, is divided into a first display unit 1261 and a second display unit 1262. Of these, the first display unit 1261 is constructed to include a segment type or dot matrix type liquid crystal display device 1268 and a liquid crystal drive control circuit 1264 for controlling the drive of the liquid crystal display device 1268 for displaying letters or characters, although not especially limited thereto. The information to be displayed is fed from the control microcomputer 121 through the input/output port 1211B. In case the portable station is used as the operation terminal of the game machine, for example, the first display unit 1261 can display the letter data including the channel number of the corresponding portable station itself (i.e., the portable station number corresponding to the portable station discriminating information), the calendar of the present day and time and the elapsed time from the game start. The second display unit 1262 is constructed to include: a dot matrix type liquid crystal display device 1265; a video RAM 1266 for drawing the display data to be displaying in the liquid crystal display device 1265; a drawing control circuit 1267 for controlling the drawing of the video RAM 1266; a liquid crystal drive control circuit 1268 for driving and controlling the liquid crystal display device 1265 on the basis of the drawn display data; and a color control circuit 1269 for changing the combination of display colors in the case of the color display, although not especially limited thereto. For example, the second display unit 1262 is used for displaying the finer information of the letter data or image data received from the base station, and the information to be displayed is fed from the control microcomputer 121 through the input/output port 1211B. The displaying operations of the first and second display units 1261 and 1262 are determined according to the command or control data fed from the control microcomputer 121.

Figure 19:
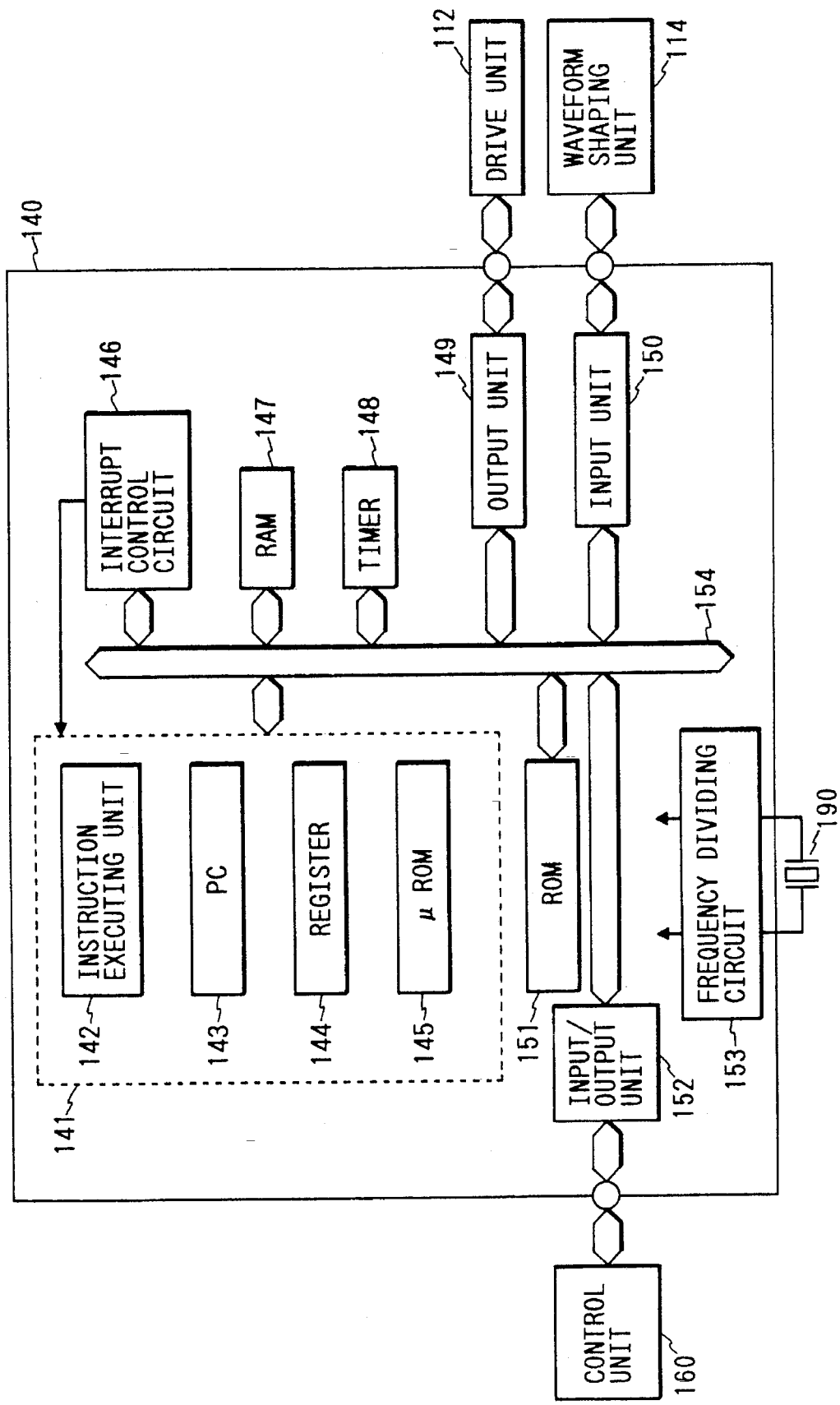
FIG. 19 is a block diagram showing another control microcomputer to be applied to the base station.

FIG. 19 shows a block diagram of another control microcomputer to be applied to the base station. The control microcomputer 140, as shown, has its CPU 141 and peripheral functions formed on a single semiconductor substrate of single crystalline silicon or the like. The CPU 141 is constructed to include an instruction executing unit 142, a program counter (as will also be abbreviated to "PC") 143, a register 144 and a microprogram ROM (as will also be abbreviated to "μ ROM") 145, although not especially limited thereto. The program counter 143 latches the address of a macro instruction (as will also be shortly referred to as the "instruction") to be subsequently executed. The microprogram ROM 145 stores the microprogram which is constructed of a plurality of micro-instructions. When the macro-instructions are fetched by the CPU 141 in accordance with the value of the program counter, they are decoded by the micro-address decoder to generate the access address of the microprogram ROM 145. As a result, the leading microinstruction of the microinstruction series corresponding to that macroinstruction is read out from the microprogram ROM 145. The access addresses of the second and subsequent microinstructions of the microinstruction series are designated by the address described in the next address information field of the microinstruction which has been read out just before, and are fed to the microprogram ROM 145. The microinstructions thus sequentially read out from the microprogram ROM 145 are decoded by the microinstruction decoder so that the control signals for controlling the individual units are generated. In case the instruction executing procedure is changed by an interruption, the instruction control unit executes the processing of setting the program counter with the leading macroinstruction address of the program for specifying the processing to be changed. The aforementioned instruction executing unit 142 should be understood to include the aforementioned micro-address decoder, microinstruction decoder and instruction control unit and an operation circuit for operating the data and addresses.

The peripheral functions of the control microcomputer 140 are constructed to include: an operation program storing ROM 151; a RAM 147 for providing the work area of the CPU 141 or the temporary storage area of data; a timer 148; an interrupt control circuit 146; an input unit 150 for inputting the transmission signal from a waveform shaping unit through an external terminal; an output unit 149 for outputting the transmission signal to the drive unit 112 through an external terminal; an input/output unit 152 for transferring data with a control unit 160 such as the personal computer through an external terminal; and a frequency dividing circuit 158 for dividing the frequency of the pulse signal coming from a quartz oscillator 190 disposed outside of the control microcomputer 140 to generate and Feed a Frequency-divided signal to the CPU 141 or the like. The CPU 141, the operation program storing ROM 151, the temporary data storing RAM 147, the timer 148, the interrupt control circuit 146, the input unit 150, the output unit 149 and the input/output unit 152 are enabled to transfer the data to and from each other through an internal bus 154. Incidentally, this internal bus 154 includes an address bus, a data bus and a control bus, although not shown.

The comparison with the construction of FIG. 6 reveals that the difference resides in the CPU 141 of the microprogram type and in that the timer 148 is constructed to include a multi-channel timer counter, as in FIG. 6, although it is shown in the form of a single circuit block. Incidentally, the control microcomputer of the portable stations 120 and 130 can also adopt the circuit construction similar to the aforementioned one excepting the program of the 151.

The operations of the control microcomputer 140 will be schematically described with reference to FIG. 19. The control microcomputer 140 has a signal sending period, a response awaiting period, a signal receiving period and a signal send preparing period. In the signal sending period, the transmission data to the portable station, which have been stored in the RAM 147 till then, are read out to the register 144 by the control of the instruction executing unit 142. Next, the decision of the values "1"/"0" of the data is executed from the leading bit of the data written in the register 144 by the instruction executing unit 142. Next, the output unit 149 is so controlled by the instruction executing unit 142 that a predetermined voltage may be outputted for a predetermined period from the output unit 149 in accordance with the decided data value. At this time, the aforementioned predetermined period for which the predetermined voltage is outputted is controlled by the timer 148 in accordance with the preset output period information. The output unit 149 outputs a voltage at the high level, if the instruction executing unit 142 decides the level at "1", and a voltage at the low level if the decision is at "0", although not especially limited thereto. The operations described above are carried out for all those transmission data to the portable stations, that are written in the register 144. After the transmission data written in the register 144 have been outputted to the drive unit 112, the response awaiting period is entered so that the control microcomputer 140 will not transfer the transmission signal through the output unit 149 and the input unit 150. When the transmission signal is inputted to the input unit 150 from the waveform shaping unit 114, the instruction executing unit 142 is started so that the interrupt control unit 146 outputs an interrupt signal to the CPU 141. Then, the instruction executing unit 142 in the CPU 141 interrupts the operations having been executed in the response awaiting period, so that the transmission signal inputted to the input unit 150 is decided as to the levels "1"/"0". As a result, the information of "1" or "0" is latched in the RAM 147. At this time, the voltage inputted to the input unit 150 is decided as to the level "1"/"0" at a predetermined time interval by the control of the timer 148. Next, the received data are read out by the CPU and transferred to the control terminal through the input/output port.

Figure 20:
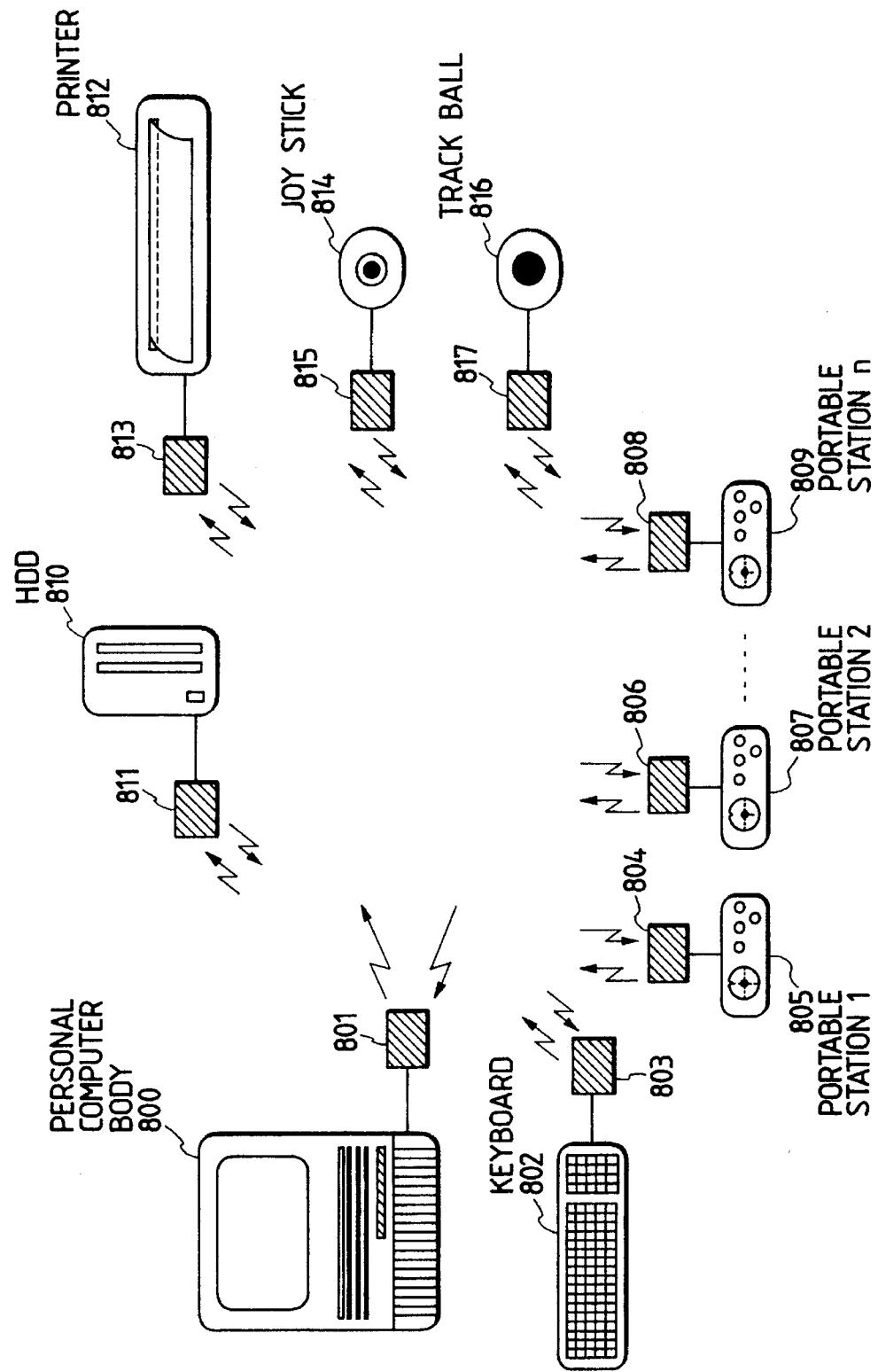
FIG. 20 is a block diagram showing the entire transmission signal processing system utilizing the optical communications.

FIG. 20 shows an overall block diagram of the transmission signal processing system utilizing the optical communications. This system is constructed to include a personal computer body 800 acting as the control terminal, a keyboard 802 acting as the peripheral device of the personal computer body 800, game machine operation terminals 805, 807 and 809, a track ball 816, a joy stick 814, a printer 812, a hard disk driver (HDD) 810, a base station 801, and a plurality of portable stations 803, 804, 806, 808, 811, 813, 815 and 817. The keyboard 802, the game machine operation terminals 805, 807 and 809, the track ball 816, the joy stick 814, the printer 812 and the hard disk driver (HDD) 810 are respectively connected with the portable stations 803, 804, 806, 808, 816, 815, 813 and 811. The personal computer body 800 is connected with the base station 801. The base station and the portable stations perform the data transmissions through the optical communications in accordance with the transmission sequence, as has been described with reference to FIGS. 14 to 17. The system may be constructed either to include the control terminal 800, the game machine operation terminals 805, 807 and 809, the base station 801 and the portable stations 804, 806 and 808 only or to include the control terminal 800, the keyboard 802, the printer 812, the base station 801 and the portable stations 803 and 813 only. This system construction may be modified at will.

The following effects can be obtained according to the embodiments thus far described.

(1) The portable station discriminating information (as indicated by the frame synchronizing signal 302) is assigned to the individual portable stations 120 and 130 by the base station 110. This base station 110 outputs the transmission signal including the portable station discriminating information for discriminating the mating portable station of the transmission. According to the discriminating information contained in the transmission signal, the portable stations 120 and 130 recognizes whether or not they are the mates of transmission. The portable station corresponding to the portable station discriminating information analyzes the transmission signal when it receives the same signal. The portable station transmits its transmission signal as a response to the base station if it should make some response to the transmitting base station. In this way, the transmission from the base station and the responding transmission from the portable station are periodically carried with by changing the portable station discriminating information sequentially. Thus, the link between the base station and the portable stations is established sequentially for the changed portable stations in the time sharing manner, and the data communications between the base station and the portable stations in the linking relation are carried out in the half-duplex manner.

Thanks to the half-duplex data communications, therefore, the transmissions from the base station 110 to the portable stations and the communications from the portable stations to the base station 110 are not concurrent so that the optical interference can be prevented between the single base station 110 and the plurality of portable stations 120 and 130.

Since, moreover, the links between the base station 110 and the portable stations 120 and 130 are established sequentially for the changed portable stations in the time sharing manner, a necessary response can be instantly made to the transmission from the base station so that the real-time property and the responsiveness in the information transmissions can be improved.

As a result, the one-to-one communications in the cord-connected system of the prior art, e.g., between the personal computer and its peripheral devices or between the game machine body and its operation terminal can be realized highly reliably without any cord.

The realization of the one-to-one communications thus made cordless matches the private transmissions between a specific portable station and the base station.

(2) The use of the error detecting/correcting codes can further improve the reliability of the cordless information transmissions.

(3) The connection or link between the base station and the portable stations can be flexibly established because the base station 110 supports the paging function. In ease the base station is coupled to the game machine body or in case the portable stations are coupled to the game machine operation terminals, for example, the paging function can be applied to the setting of the penalty for rejecting the operations from the game machine control terminals for a predetermined period as the game proceeds. Since, moreover, the base station data processing means is additionally given the function to variably set the sequence of the portable stations to be assigned to the timing for making the transmissions possible to the portable stations at a predetermined time interval, the sequence for the base station to access or communicate with the plurality of portable stations can also be made flexible.

(4) The inclusion of the display control unit 126 in the game machine operation terminals to be connected with the portable stations can match the versatility of the game easily so that the content unable to be displayed in the game machine body is displayed in the game machine operation terminals or so that the information to be privately transmitted to the remaining game machine operation terminals for the sake of progressing the game is displayed.

Although our invention has been specifically described in connection with its embodiments, it should not be limited thereto but can naturally be modified in various manners without departing from the gist thereof. For example, the control procedure for realizing the time sharing half-duplex information transmission protocol should not be limited to the control exclusively using the interruptions making use of the timer, as has been described with reference to FIGS. 14 and 15, but a timing regulating control signal may be generated in advance by using a dedicated timing controller.

In the description thus far made, our invention has been described in case it is applied to the optical communications providing the background of application thereof, but can also be applied to the high-frequency radio communications making use of the frequency diffusion modulation.

The effects to be obtained by the representative of the invention disclosed herein will be briefly described in the following.

(1) The link between the base station and the portable stations is established in a time sharing manner by changing the portable stations sequentially, and the data communications between the base station and the portable station in the established link are carried out in a half-duplex manner. Thus, the simultaneous transmissions from the base station to the portable stations and from the portable stations to the base station are avoided so that the radio interference between one base station and a plurality of portable stations but also the optical interference in the optical communications can be prevented.

(2) Since the establishment of the aforementioned link between the base station and the portable stations is effected in the time sharing manner sequentially for the different portable stations, the response necessary for the transmission from the base station can be instantly effected to improve the real-time property and responsiveness in the information transmission.

(3) From these effect, the linear communications between either the existing cord-circuit system such as the personal computer and its peripheral unit or the game machine body and its operation terminal are realized highly reliably in a cordless manner.

(4) The realization of these cordless linear communications can improve the usability and handling and accordingly the feasibility of the change in the arrangement of the device layout.

(5) The use of the error detecting/correcting codes further improves the reliability of the cordless information transmissions.

(6) The support of the paging function by the base station gives a flexibility to the establishment of the connection or link between the base station and the portable stations.

(7) The inclusion of the display control unit in the game machine operation terminals to be connected with the portable stations can easily correspond to the versatility of the game, that is, can display either such a content auxiliary in the game machine operation terminals as can not be displayed in the game machine body or the information which is to be privately transmitted for the remaining game machine operation terminals in view of the procedure of the game.

What is claimed is:

1. An information transmitting/processing system for a game machine comprising a base station as a control terminal and a plurality of portable stations as controlled terminals, wherein said base station includes:
a monitor which displays a predetermined picture and which has a regular frame period when the predetermined picture changes,
base station transmitting means for radio-transmitting a base station transmission signal from the base station at regular time intervals to each of the portable stations which is designated by portable station discriminating information transmitted from said base station to said portable stations, and
base station receiving means for radio-receiving portable station transmission signals, each portable station transmission signal being transmitted from one of the designated portable stations during each regular time interval, wherein each of said portable stations includes:
portable station receiving means for radio-receiving the base station transmission signal during each regular time interval, and portable station transmitting means adapted to be designated by said portable station discriminating information for radio-transmitting the portable station transmission signal to said base station in response to the base station transmission signal coming from said base station within the range of the regular time interval, wherein the base station periodically communicates with all or predetermined ones of the plurality of portable stations within the regular frame period, and wherein the base station performs radio transmissions with each of the portable stations using half-duplex communications during each regular time interval.

2. An information transmitting/processing system according to claim 1, wherein:
said base station transmitting means includes a first light emitting unit which transmits the base station transmission signal as a first optical signal, and each of said portable station transmitting means includes a second light emitting unit which transmits one of said portable station transmission signals as a second optical signal; and wherein:
said base station receiving means includes a first light receiving unit which converts said portable station transmission signal from said second optical signal to a first electric signal for outputting said first electric signal, and each of said portable station receiving means includes a second light receiving unit which converts the base station transmission signal from said first optical signal to a second electric signal for outputting said second electric signal.

3. An information transmitting/processing system according to claim 2,
  wherein said base station includes:
    first timing signal generating means for generating a first timing signal enabling said base station transmission signal to be transmitted to each of said portable stations at said regular time interval; and
    base station data processing means for changing said portable station discriminating information at each generation of said first timing signal to feed the changed portable station discriminating information to said base station transmitting means and for analyzing the portable station transmission signals coming from said portable stations and received by said base station receiving means, and
  wherein each of said portable stations includes:
    second timing signal generating means adapted to be designated by said portable station discriminating information for generating a second timing signal enabling the portable station transmission signal to be transmitted to said base station in response to the base station transmission signal coming from said base station and within the range of said regular time interval; and
    portable station data processing means for analyzing the base station transmission signal coming from said base station and received by said portable station receiving means and for feeding the portable station transmission signal, which is to be transmitted to said base station, to said portable station transmitting means in synchronism with said second timing signal.

4. An information transmitting/processing system according to claim 3,
  wherein said base station transmitting means further includes a first drive unit for driving said first light emitting unit in response to a signal fed from said base station data processing means,
  wherein said base station receiving means further includes a first waveform shaping unit for shaping a waveform of said first electric signal, which is obtained by converting said second optical signal received by said first light receiving unit, to feed a first shaped electric signal to said base station data processing means,
  wherein said portable station transmitting means further includes a second drive unit for driving said second light emitting unit in response to a signal fed from said portable station data processing means, and
  wherein said portable station receiving means further includes a second waveform shaping unit for shaping the waveform of said second electric signal, which is obtained by converting said first optical signal received by said second light receiving unit, to feed a second shaped electric signal to said portable station data processing means.

5. An information transmitting/processing system according to claim 4,
  wherein said base station data processing means further includes:
    first means for adding error detecting/correcting codes to the base station transmission signal to be transmitted; and
    second means for detecting/correcting an error with reference to said error detecting/correcting codes contained in the portable station transmission signal received by said base station receiving means, and
  wherein said portable station data processing means further includes:
    third means for adding error detecting/correcting codes to the portable station transmission signal to be transmitted; and
    fourth means for detecting/correcting an error with reference to said error detecting/correcting codes contained in the base station transmission signal received by said portable station receiving means.

6. An information transmitting/processing system according to claim 5,
  wherein said base station data processing means further includes fifth means for limiting the range of said portable stations to be assigned to the timing, enabling a transmission to each of said portable stations at said regular time interval.

7. An information transmitting/processing system according to claim 6,
  wherein said base station data processing means further includes sixth means for changing the sequence, in which said base station accesses said portable stations to be assigned, for the timing, enabling the transmission to each of said portable stations at said regular time interval.

8. An information transmitting/processing system according to claim 2,
  wherein said base station performs optical communications with said plurality of portable stations in a half-duplex time sharing manner so that one communication cycle between said base station and one portable station includes:
    a first cycle at which said first light emitting unit emits said first optical signal,
    a second cycle at which one portable station processes received data based on said first optical signal which is emitted from said first light emitting unit and which is received by said second light receiving unit therein,
    a third cycle at which one portable station emits said second optical signal from said second light emitting unit therein in response to designation thereof, and
    a fourth cycle at which the base station processes transmitted data based on said second optical signal which is emitted from said second light emitting unit of one portable station and which is received by said first light receiving unit therein; and
  wherein said base station periodically communicates with said plurality of portable stations in a predetermined sequence within said regular time interval.

9. A base station to be coupled to a plurality of portable stations, comprising:
  a monitor which displays a predetermined picture and which has a frame period, having regular time intervals, when the predetermined picture changes;
  generation means for generating a set of discrimination information for discriminating between each of said plurality of portable stations at each of said regular time intervals within the range of the frame period; and
  first transmission means for radio-transmitting a base station transmission signal to be transmitted from the base station at each of a series of said regular time intervals, to each of said portable stations,
  wherein the base station periodically communicates with all or predetermined ones of the plurality of portable stations within the frame period, and wherein the base station performs radio transmissions with each of the portable stations using half-duplex communications during each regular time interval.

10. A base station according to claim 9, wherein said first transmission means includes a first light emitting unit for outputting the base station transmission signal to be transmitted as an optical signal.

11. A base station according to claim 10, further comprising:

first timing signal generating means for generating a first timing signal enabling the base station transmission signal to be transmitted at said one of said regular time intervals to each of said portable stations; and first data processing means for changing said discrimination information at each generation of said first timing signal to feed changed discrimination information to said first transmission means.

12. A base station according to claim 11, wherein said first transmission means includes a first drive unit for driving said first light emitting unit in response to a signal fed from said first data processing means.

13. A base station according to claim 12, wherein said first data processing means further includes first means for adding error detecting/correcting codes to the base station transmission signal to be transmitted.

14. A base station according to claim 13, wherein said first data processing means further includes second means for limiting the range of said portable stations to be assigned to the first timing signal, enabling a transmission to each of said portable stations at said regular time interval.

15. A base station according to claim 14, wherein said first data processing means further includes third means for changing the sequence, in which said base station accesses said portable stations to be assigned, for the first timing signal, enabling the transmission to each of said portable stations at said regular time interval.

16. A base station according to claim 15, further comprising first reception means for radio-receiving the information from said portable stations, wherein said first reception means includes a first light receiving unit for converting the optical signal received from one of said portable stations into an electric signal to output said electric signal.

17. A game machine comprising:

a monitor having a screen which displays a predetermined picture based on picture data, the picture displayed on the screen being changed for every predetermined time period;

a plurality of operation terminals to which predetermined station numbers are assigned, respectively, the plurality of operation terminals each including:

a first light emitting element which selectively emits a first optical signal representing the corresponding station number and the operation data, a first light receiving element which selectively receives a second optical signal, and a first data processing unit which is coupled to the first light receiving element to receive received data based on the second optical signal, which analyzes the received data containing information representing the station number of one operation terminal and which allows the first light emitting element to emit the first optical signal when the station number assigned thereto is specified by the information in the received data; and a game machine body which is coupled to the monitor to send the picture data and which sends the monitor renewal picture data for every predetermined time period and which includes:

a second light emitting element which selectively emits the second optical signal, a second light receiving element which selectively receives the first light signal, and a second data processing unit which is coupled to the second light emitting element and to the second light receiving element, which provides transmission data containing information representing the corresponding station number assigned to the operation terminal to be communicated to the second light emitting element so that the second light emitting element emits the second optical signal based on the transmission data and which provides the monitor the picture data according to the first optical signal received by the second light receiving element, wherein the game machine body performs optical communications with the plurality of operation terminals in a half-duplex time sharing manner so that one communication cycle between the game machine body and one operation terminal includes:

a first cycle at which the second light emitting element in the game machine body emits the second optical signal, a second cycle at which one operation terminal processes received data based on the second optical signal, a third cycle at which one operation terminal emits the first optical signal in response to designation thereof, and a fourth cycle at which the game machine body processes transmitted data based on the first optical signal, and wherein the game machine body periodically communicates with all or predetermined ones of the plurality of operation terminals in a desired sequence within the predetermined time period.

18. A game machine according to claim 17, wherein the first data processing unit is a microcomputer, and the microcomputer provides data containing both the corresponding station number and the operation data to the first light emitting unit.

19. A game machine according to claim 18, wherein the plurality of portable stations each further comprises a data input unit, coupled to the microcomputer, providing the operation data to the microcomputer.

20. A game machine according to claim 19, wherein the data input unit includes a keyboard, a mouse, a joy stick or a track ball.

21. A game machine according to claim 19, wherein the plurality of portable stations each further comprises a display unit, coupled to the microcomputer, for displaying predetermined data provided from the microcomputer.

22. A game machine according claim 21, wherein the display unit includes a liquid crystal display device.

23. A game machine comprising:

a plurality of operation terminals to which predetermined station numbers are assigned, respectively, the plurality of operation terminals each including:

a first light emitting element which selectively emits a first optical signal representing the corresponding station number and the operation data, a first light receiving element which selectively receives a second optical signal, and a first data processing unit which is coupled to the first light receiving element to receive received data based on the second optical signal, which analyzes the received data containing information representing the station number of one operation terminal and which allow the first light emitting element to emit the first optical signal when the station number assigned thereto is specified by the information in the received data, and a game machine body which includes:
- a second light emitting element which selectively emits the second optical signal,
- a second light receiving element which selectively receives the first light signal, and
- a second data processing unit which is coupled to the second light emitting element and to the second light receiving element, which provides transmission data containing information representing the corresponding station number assigned to the operation terminal to be communicated to the second light emitting element so that the second light emitting element emits the second optical signal based on the transmission data and which provides display data based on the first optical signal received by the second light receiving element, wherein the game machine body performs optical communications with the plurality of operation terminals in a half-duplex time sharing manner so that one communication cycle between the game machine body and one operation terminal includes a first cycle at which the second light emitting element in the game machine body emits a second optical signal, a second cycle at which one operation terminal processes received data based on a second optical signal, a third cycle at which one operational terminal emits a first optical signal in response to designation thereof and a fourth cycle at which the game machine body processes transmitted data based on the first optical signal, and wherein the game machine body periodically communicates all of predetermined ones of the plurality of operation terminals in a desired sequence within a display time period defining a changing time or one frame on a screen of a monitor to be coupled to the game machine body so that the game machine body can provide display data for one frame to the monitor for every display time period.

24. A game machine according to claim 23, wherein the first data processing unit is a microcomputer, and the microcomputer provides data containing both the corresponding station number and the operation data to the first light emitting unit.

25. A game machine according to claim 24, wherein the plurality of portable stations each further comprises a data input unit, coupled to the microcomputer, providing the operation data to the microcomputer.

26. A game machine according to claim 25, wherein the data input unit includes a keyboard, a mouse, a joy stick or a track ball.

27. A game machine according to claim 25, wherein the plurality of portable stations each further comprises a display unit, coupled to the microcomputer, for displaying predetermined data provided from the microcomputer.

28. A game machine according to claim 27, wherein the display unit includes a liquid crystal display device.

* * * * *